(12) United States Patent
Yamaoka et al.

(10) Patent No.: US 12,422,812 B2
(45) Date of Patent: Sep. 23, 2025

(54) MALFUNCTION ANALYSIS SUPPORT PROGRAM STORAGE MEDIUM AND MALFUNCTION ANALYSIS SUPPORT APPARATUS

(71) Applicant: Mitsubishi Electric Corporation, Tokyo (JP)

(72) Inventors: Takayuki Yamaoka, Tokyo (JP); Motohiko Nakamura, Tokyo (JP); Kenji Mine, Tokyo (JP); Hirokazu Kikuta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 330 days.

(21) Appl. No.: 17/921,376

(22) PCT Filed: Dec. 22, 2020

(86) PCT No.: PCT/JP2020/048032
§ 371 (c)(1),
(2) Date: Oct. 26, 2022

(87) PCT Pub. No.: WO2022/137358
PCT Pub. Date: Jun. 30, 2022

(65) Prior Publication Data
US 2023/0185267 A1    Jun. 15, 2023

(51) Int. Cl.
*G05B 19/05* (2006.01)
*H04N 13/111* (2018.01)
*H04N 13/167* (2018.01)

(52) U.S. Cl.
CPC ......... *G05B 19/058* (2013.01); *G05B 19/054* (2013.01); *H04N 13/111* (2018.05); *H04N 13/167* (2018.05)

(58) Field of Classification Search
CPC .............. G05B 19/058; G05B 19/054; G05B 2219/31455; G05B 2219/31472;
(Continued)

(56) References Cited

U.S. PATENT DOCUMENTS 10,410,339 B2    9/2019   Ohnuki et al.
11,163,298 B2    11/2021  Yoshikawa
(Continued)

FOREIGN PATENT DOCUMENTS

CN    109448118 A    3/2019
CN    111090255 A    5/2020
(Continued)

OTHER PUBLICATIONS

Office Action mailed on Dec. 26, 2023 for the corresponding Japanese patent application No. 2022-064063 and an English machine translation thereof, 4 pages.
(Continued)

*Primary Examiner* — Christopher W Carter
(74) *Attorney, Agent, or Firm* — XSENSUS LLP

(57) ABSTRACT

A malfunction analysis support program causes a computer to perform a log data acquisition step, an action reproduction step, a three-dimensional data display step, a processing step being at least one of a program operation display step, a waveform display step, or a video display step, and a time synchronization step. The log data acquisition step obtains log data temporally sequentially recording a state of an operational part and input-output data of a control signal. The action reproduction step generates action reproduction simulation data obtained by causing a virtual object-to-be-controlled to reproduce an action based on the log data. The three-dimensional data display step displays the action reproduction simulation data as three-dimensional data. The time synchronization step synchronizes time between three-
(Continued)

dimensional data displayed by the three-dimensional data display step and data displayed by the processing step. The three-dimensional data display step displays the three-dimensional data according to display setting information.

14 Claims, 22 Drawing Sheets

(58) Field of Classification Search
CPC ............ G05B 19/4184; G05B 23/0272; G05B 23/0221; H04N 13/111; H04N 13/167; B25J 9/1674
See application file for complete search history.

(56) References Cited

U.S. PATENT DOCUMENTS

| | | | |
|---|---|---|---|
| 11,188,048 | B2 | 11/2021 | Miyasaka |
| 2018/0172518 | A1 | 6/2018 | Hiramatsu |
| 2020/0133225 | A1* | 4/2020 | Hada ................... G05B 19/19 |
| 2020/0241513 | A1* | 7/2020 | Yoshikawa ...... G05B 19/41885 |

FOREIGN PATENT DOCUMENTS

| | | |
|---|---|---|
| CN | 111183401 A | 5/2020 |
| CN | 111971536 A | 11/2020 |
| JP | 11-259120 A | 9/1999 |
| JP | 2000-250775 A | 9/2000 |
| JP | 2009-151634 A | 7/2009 |
| JP | 2013-51282 A | 3/2013 |
| JP | 2017-94407 A | 6/2017 |
| JP | 2018-101348 A | 6/2018 |
| JP | 2020-13526 A | 1/2020 |
| WO | 2019/069436 A1 | 4/2019 |

OTHER PUBLICATIONS

Office Action issued Aug. 8, 2023 in corresponding Japanese Patent Application No. 2022-064063 and machine English translation thereof, 5 pages.
International Search Report and Written Opinion mailed on Mar. 16, 2021, received for PCT Application PCT/JP2020/048032, filed on Dec. 22, 2020, 10 pages including English Translation.
Notice of Reason for Refusal mailed on Oct. 26, 2021, received for JP Application 2021-531437, 7 pages including English Translation.
Decision of Refusal mailed on Jan. 18, 2022, received for JP Application 2021-531437, 9 pages including English Translation.
Office Action mailed on Mar. 7, 2025 in corresponding Chinese patent application No. 202080100334.X.
Action issued Jul. 10, 2025 in Chinese Patent Application No. 202080100334.X, 67 pages.

* cited by examiner

FIG.11

| TIME | SENSOR 141 | SENSOR 142 | SHAFT ANGLE |
|---|---|---|---|
| 10:10:10 | 0 | 0 | 0 |
| 10:10:11 | 1 | 0 | 0 |
| 10:10:12 | 1 | 0 | 0 |
| 10:10:13 | 0 | 0 | 20 |
| 10:10:14 | 0 | 0 | 40 |
| 10:10:15 | 0 | 0 | 60 |
| 10:10:16 | 0 | 0 | 80 |
| 10:10:17 | 0 | 1 | 100 |
| 10:10:18 | 0 | 1 | 100 |
| 10:10:19 | 0 | 0 | 80 |
| 10:10:20 | 0 | 0 | 60 |
| 10:10:21 | 0 | 0 | 40 |
| 10:10:22 | 0 | 0 | 20 |
| 10:10:23 | 0 | 0 | 0 |
| 10:10:24 | 0 | 0 | 0 |

FIG.14

| TIME | SENSOR 141 | SENSOR 142 | SHAFT ANGLE |
|---|---|---|---|
| 11:11:10 | 0 | 0 | 0 |
| 11:11:11 | 1 | 0 | 0 |
| 11:11:12 | 1 | 0 | 0 |
| 11:11:13 | 0 | 0 | 20 |
| 11:11:14 | 0 | 0 | 40 |
| 11:11:15 | 0 | 0 | 60 |
| 11:11:16 | 0 | 0 | 80 |
| 11:11:17 | 0 | 0 | 100 |
| 11:11:18 | 0 | 0 | 100 |
| 11:11:19 | 0 | 0 | 100 |
| 11:11:20 | 0 | 0 | 100 |
| 11:11:21 | 0 | 0 | 100 |
| 11:11:22 | 0 | 0 | 100 |
| 11:11:23 | 0 | 0 | 100 |
| 11:11:24 | 0 | 0 | 100 |

MALFUNCTION ANALYSIS SUPPORT PROGRAM STORAGE MEDIUM AND MALFUNCTION ANALYSIS SUPPORT APPARATUS

CROSS-REFERENCE TO RELATED APPLICATION

The present application is based on PCT filing PCT/JP2020/048032, filed Dec. 22, 2020, the entire contents of which are incorporated herein by reference.

FIELD

The present disclosure relates to a malfunction analysis support program storage medium and a malfunction analysis support apparatus for supporting analysis of a malfunction of an object to be controlled.

BACKGROUND

Patent Literature 1 discloses a trouble analysis support apparatus That supports analysis of a malfunction when the malfunction has occurred in a manufacturing facility including a control device and a device to be controlled by the control device. The trouble analysis support apparatus described in Patent Literature 1 includes a control information recording unit and a simulation unit. The control information recording unit generates log files of image information, of an acoustic signal, and of control information of the production facility based on the acoustic signal of the production facility collected by a microphone, on an image signal of an image of the manufacturing facility captured by a camera, and on a control signal for the production facility output from a programmable controller. The simulation unit regenerates image information and outputs the image information to a display, regenerates the acoustic signal and outputs the acoustic signal to a speaker, and simulates an operation of the programmable controller based on an input contact relating to the control information, and compares the result of simulation with an output contact relating to the control information thus to detect the difference. The simulation unit outputs, to the display, internal information of the simulated programmable controller, in a ladder diagram format. Upon outputting the image information, acoustic information, and the internal information having a ladder diagram format of the simulated programmable controller to be output, the simulation unit approximately synchronizes with one another the image information, the acoustic information, and the internal information.

CITATION LIST

Patent Literature

Patent Literature 1: Japanese Patent Application Laid-open No. 2000-250775

SUMMARY

Technical Problem

However, according to the above conventional technology, the image information is obtained by imaging the manufacturing facility from a particular direction. Accordingly, the image information output by the simulation unit merely enables the condition to be inspected from that particular direction. In addition, a portion of the manufacturing facility other than the area imaged by the camera will have no image information. This presents a problem of difficulty in understanding the overall situation of a malfunction of the manufacturing facility. This presents another problem in that observation of a situation from multiple directions requires installation of multiple cameras.

The present disclosure has been made in view of the foregoing, and it is an object of the present disclosure to provide a malfunction analysis support program that enables inspection, from any direction, of the condition of a portion of a malfunction occurring in a manufacturing facility without installation of multiple cameras.

Solution to Problem

To solve the problem and achieve the object described above, a malfunction analysis support program of the present disclosure for supporting analysis of a malfunction of an object-to-be-controlled including an operational part causes a computer to perform a log data acquisition step, an action reproduction step, a three-dimensional data display step, a processing step, and a time synchronization step, the processing step being at least one display step of a program operation display step, a waveform display step, and a video display step. The log data acquisition step obtains log data that records, in a time sequence, a state of the operational part, and input-output data of a control signal between the object-to-be-controlled and a control device that controls the object-to-be-controlled. The action reproduction step generates action reproduction simulation data, which is a result of causing a virtual object-to-be-controlled to reproduce an action based on the log data, where the virtual object-to-be-controlled corresponds to the object-to-be-controlled. The three-dimensional data display step displays the action reproduction simulation data on a display unit as three-dimensional data. The program operation display step displays a status of execution of a control program executed by the control device on the display unit based on the log data. The waveform display step displays, on the display unit, the state of the operational part and the input-output data of the control signal based on the log data using a waveform over time. The video display step displays video data generated by imaging of a state of the object-to-be-controlled, on the display unit. The time synchronization step synchronizes time between the three-dimensional data, reproduced in the action reproduction step and to be displayed in the three-dimensional data display step, and data to be displayed by the processing step. The three-dimensional data display step displays the three-dimensional data on the display unit as viewed from a viewpoint position that has been moved according to display setting information representing the viewpoint position for use when the virtual object-to-be-controlled is to be displayed on the display unit as the three-dimensional data.

Advantageous Effects of Invention

A malfunction analysis support program according to the present disclosure provides an advantage in enabling inspection, from any direction, of the condition of a portion of a malfunction occurring in a manufacturing facility without installation of multiple cameras.

BRIEF DESCRIPTION OF DRAWINGS

FIG. 11 is a diagram illustrating an example of log data when the facility is in a normal condition.

FIG. 14 is a diagram illustrating an example of log data when a malfunction has occurred in the facility.

DESCRIPTION OF EMBODIMENTS

A malfunction analysis support program storage medium and a malfunction analysis support apparatus according to embodiments of the present disclosure will be described in detail below with reference to the drawings.

First Embodiment

Figure 1:
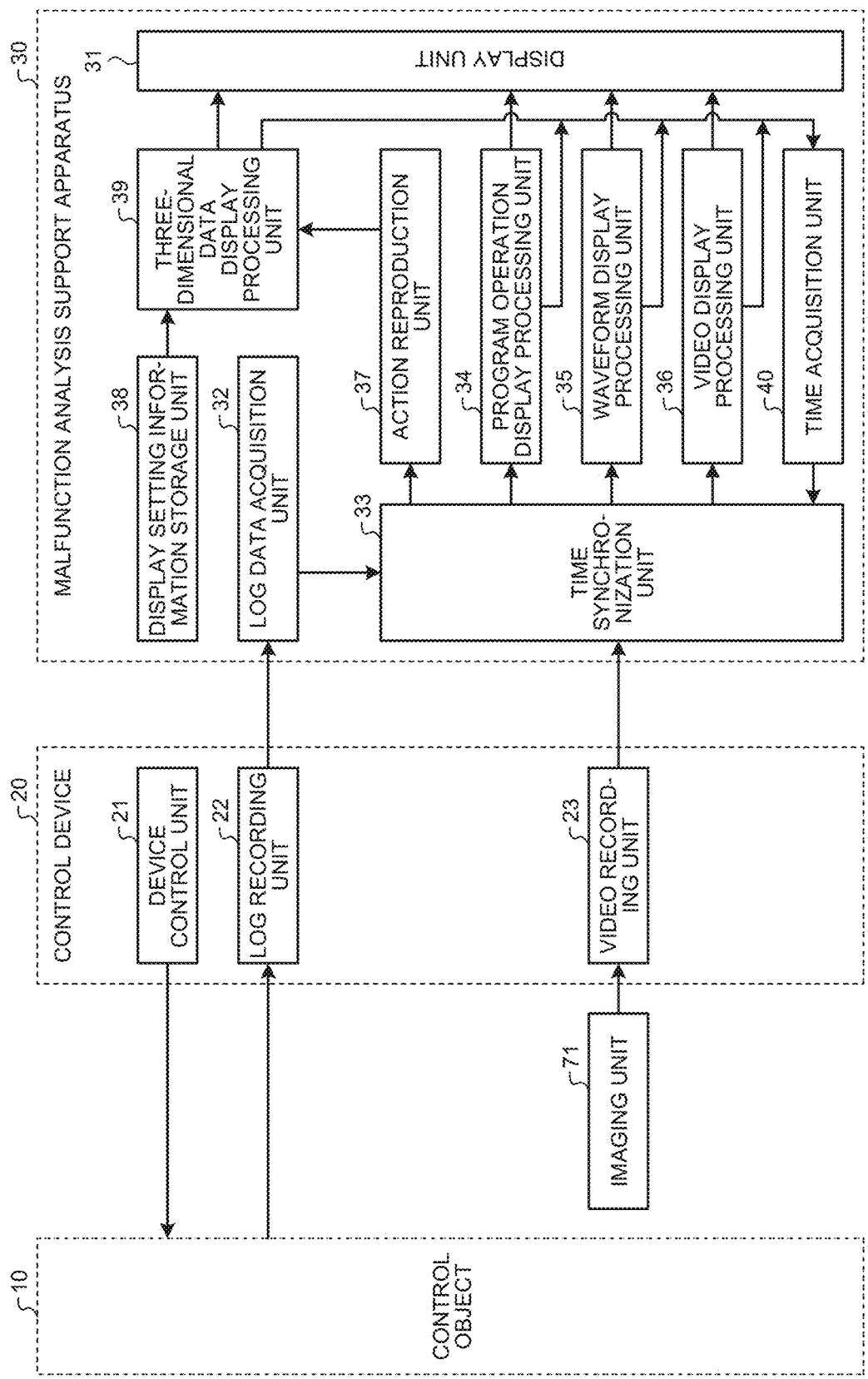
FIG. 1 is a block diagram illustrating an example of configuration of a malfunction analysis support system according to a first embodiment.

FIG. 1 is a block diagram illustrating an example of configuration of a malfunction analysis support system according to a first embodiment. A malfunction analysis support system 1 includes an object to be controlled (hereinafter referred to simply as control object) 10, a control device 20, and a malfunction analysis support apparatus 30.

The control object 10 operates under control of the control device 20, and includes an operational part. In the first embodiment, a malfunction of the control object 10 is what is to be analyzed. An example of the control object 10 is a line or a device of a factory. Examples of the operational part include a belt conveyor, a robot arm, and a robot hand.

Figure 2:
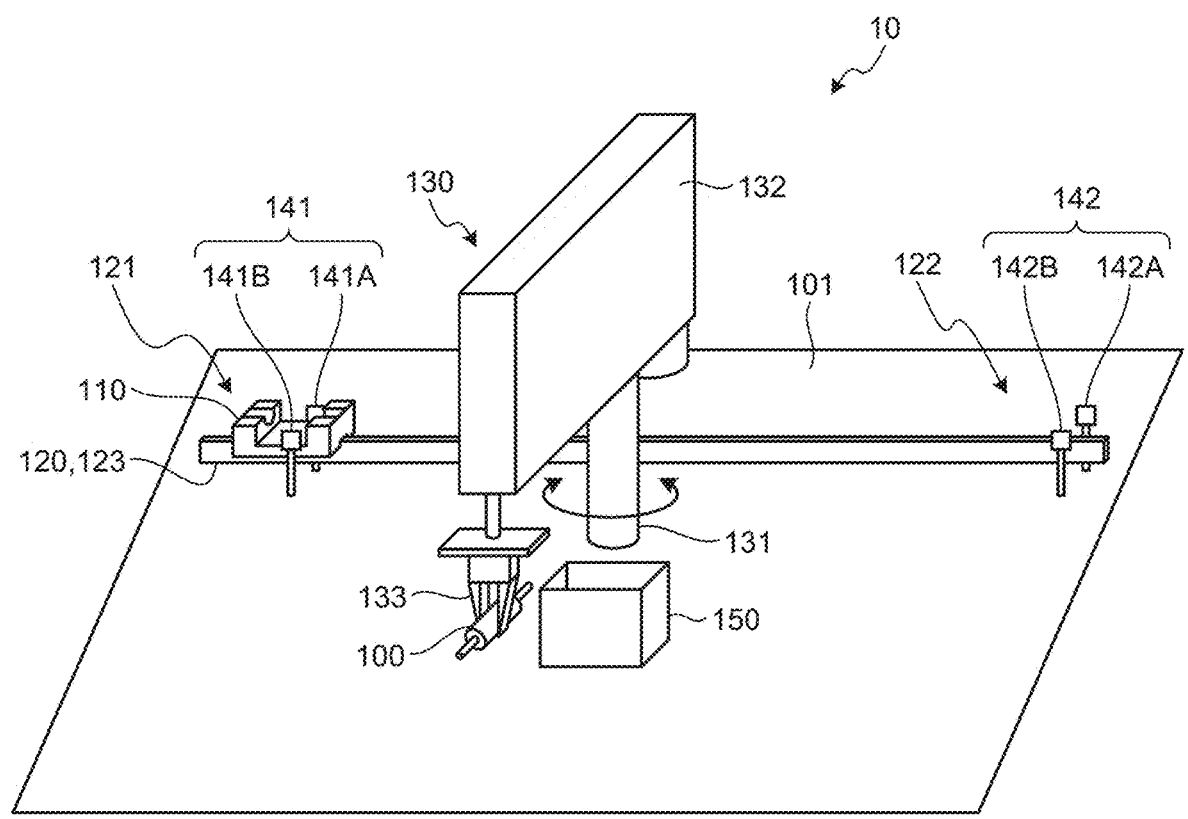
FIG. 2 is a diagram illustrating an example of an object to be controlled that is to be analyzed in the malfunction analysis support system according to the first embodiment.

FIG. 2 is a diagram illustrating an example of a control object to be analyzed in the malfunction analysis support system according to the first embodiment. This control object 10 is a test-purpose facility that performs an operation of grasping a workpiece 100 placed on a receiving tray 110 using a robot hand 133, of measuring the dimensions of the workpiece 100, and of returning the workpiece 100 onto the receiving tray 110.

The control object 10 includes the receiving tray 110, a conveyor mechanism 120, a robot hand mechanism 130, a sensor 141, a sensor 142, and an inspection unit 150.

The receiving tray 110 receives thereon the workpiece 100, which is to be analyzed. The conveyor mechanism 120 moves the receiving tray 110 between a first position 121 and a second position 122. In this respect, the conveyor mechanism 120 includes a guide rail 123 connecting between the first position 121 and the second position 122 on a support base 101, and a moving mechanism (not illustrated) for moving the receiving tray 110 along the guide rail 123.

The robot hand mechanism 130 includes a shaft 131 disposed vertically and rotatably in a center portion of the support base 101, a main body portion 132 connected to the shaft 131 to function as an arm, and a robot hand 133 provided in one end portion of the main body portion 132. In the example of FIG. 2, the shaft 131 rotates to allow the robot hand 133 to move between the first position 121 and the second position 122. In addition, the robot hand 133 can grasp the workpiece 100 placed on the receiving tray 110, at the first position 121, and can place the workpiece 100 grasped, onto the receiving tray 110, at the second position 122. In the example of FIG. 2, the robot hand mechanism 130 including the robot hand 133 is the operational part.

The sensor 141 detects that the receiving tray 110 is present at the first position 121. The sensor 142 detects that the receiving tray 110 is present at the second position 122. In one example, the sensors 141 and 142 are a transmissive or separated photosensor including light-emitting elements 141A and 142A and light-receiving elements 141B and 142B.

The inspection unit 150 is disposed midway between the first position 121 and the second position 122 to inspect the workpiece 100.

The test-purpose facility illustrated in FIG. 2 operates such that the robot hand mechanism 130 picks up the workpiece 100 from the receiving tray 110 at the first position 121, and rotates to move the workpiece 100 to the inspection unit 150. The inspection unit 150 inspects the workpiece 100. The robot hand mechanism 130 further rotates from the inspection unit 150 to the second position 122, and places the workpiece 100 onto the receiving tray 110 that has been moved to the second position 122. The robot hand mechanism 130 then rotates back to the first position 121. The test-purpose facility repeats the foregoing operation.

Returning to the description of FIG. 1, the control device 20 is a device electrically connected to the control object 10 to control operation of the control object 10 according to a predetermined control program. In addition, in the first embodiment, the control device 20 is a device that records, in a time sequence, control object information including the state of the operational part, input-output data of a control signal to and from the control object 10, and a result of actual action performed by the control object 10. The control device 20 includes a device control unit 21, a log recording unit 22, and a video recording unit 23.

The device control unit 21 stores a control program for controlling the control object 10, and controls the control object 10 according to the control program. In one example, the device control unit 21 includes an input unit that receives information from the control object 10, a processing unit that performs computational processing according to the control program, and an output unit that outputs a result from the processing unit to the control object 10. The device control unit 21 obtains input data representing the state of the control object 10 from the input unit, performs computation in the processing unit using the input data according to the control program to calculate output data for controlling the control object 10, and outputs the output data from the output unit to the control object 10. An example of the device control unit 21 is a programmable logic controller or a robot controller.

The log recording unit 22 obtains log data, which is time-series data obtained through observation over time of input-output data including input data and output data sent from and received by the device control unit 21 to and from the control object 10, and of state data representing the state of the operational part of the control object 10. Examples of the input data includes detection values of the sensors 141 and 142 obtained from the sensors 141 and 142 of the control object 10 controlled by the device control unit 21, and values obtained by computation or processing of the detection values of the sensors 141 and 142. Examples of the output data include an execution result of execution of the control program by the device control unit 21 using the input data, and a control signal to be output to the control object 10. Examples of the state data include an axis value of the robot hand mechanism 130, the rotational speed of the motor, and the position of the workpiece 100 detected by the sensors 141 and 142 in a case in which the operational part is the robot hand mechanism 130. The angle of the shaft 131 in the test-purpose facility of FIG. 2 is an example of the state data, and is stored in the device control unit 21 of the control device 20. The input data and the output data may also be hereinafter referred to collectively as input-output data. That is, the log data is data that records, in a time sequence, the state of the operational part and input-output data of a control signal between the control object 10 and the control device 20 that controls the control object 10.

The video recording unit 23 records video data, which is data captured by an imaging unit 71, which captures a video of the control object 10. The video data is an example of action record data, and includes information on the time of video capturing.

In one example, when the control object 10 includes a line or a device for producing a product, the combination of the control object 10 and the control device 20 is the manufacturing facility.

The malfunction analysis support apparatus 30 is an apparatus that displays, in time synchronization, a result of simulation that has caused a virtual control object to reproduce an action based on the log data, and an action state of the actual control object 10 reproduced using at least one of the log data and the video data to support analysis of a malfunction when the malfunction has occurred in the control object 10. In one example, the malfunction analysis support apparatus 30 can communicate with the control device 20. The malfunction analysis support apparatus 30 includes a display unit 31, a log data acquisition unit 32, a time synchronization unit 33, a program operation display processing unit 34, a waveform display processing unit 35, a video display processing unit 36, an action reproduction unit 37, a display setting information storage unit 38, a three-dimensional data display processing unit 39, and a time acquisition unit 40.

The display unit 31 visually displays information for supporting analysis of a malfunction performed by the malfunction analysis support apparatus 30. An example of the display unit 31 is a display device such as a liquid crystal display device. The malfunction analysis support apparatus 30 may include a single display unit 31 or multiple display units 31. By way of example, the malfunction analysis support apparatus 30 may include multiple display units 31 respectively correspondingly to the program operation display processing unit 34, the waveform display processing unit 35, the video display processing unit 36, and the three-dimensional data display processing unit 39, which are described later.

The log data acquisition unit 32 obtains log data from the log recording unit 22 of the control device 20. In one example, the log data acquisition unit 32 obtains log data from the log recording unit 22 in response to an instruction from the user of the malfunction analysis support apparatus 30. The term user refers to the person using the malfunction analysis support apparatus 30, the administrator who manages operation of the control object 10, or the like. The log data acquisition unit 32 may obtain a log file at a time in a form of a file from the log recording unit 22 of the control device 20, or may obtain a log file through on-demand communication such as streaming, or the like.

The time synchronization unit 33 synchronizes time between the log data obtained by the log data acquisition unit 32 and the video data obtained from the video recording unit 23 of the control device 20. Specifically, the time synchronization unit 33 synchronizes the time of the data to be provided, between the log data to be provided to the action reproduction unit 37, to the program operation display processing unit 34, and to the waveform display processing unit 35, and the video data to be provided to the video display processing unit 36. The time synchronization unit 33 checks time information included in the log data and time information included in the action record data, and adjusts the times in the data to be provided to the respective processing units.

The program operation display processing unit 34 displays the status of execution of a control program executed by the control device 20, on the display unit 31. Specifically, the program operation display processing unit 34 performs processing to display, on the display unit 31, a program operation display screen, which displays the status of execution of a control program executed by the device control unit 21. The control program executed by the device control unit 21 is typically a ladder program. This ladder program is described using a relay symbolic language, which is based on a concept of relay control circuit. Thus, the program operation display processing unit 34 generates a program operation display screen that depicts a ladder program, which is a kind of control program, in circuit diagram form. The program operation display processing unit 34 generates a program operation display screen, which displays program elements such as contacts and coils in the control program executed by the device control unit 21 in a form of a program in circuit diagram form. The program operation display processing unit 34 also obtains values of input-output data or values of state data corresponding to the program elements from the log data for a time specified, and displays these values near the corresponding program elements in the program operation display screen. Note that an On state and an Off state of a contact may be displayed differently in the program operation display screen. A technology to display the execution status and to display a value of input-output data or a value of state data over the ladder program by the program operation display processing unit 34 can be implemented using a known method. The program operation display processing unit 34 displays the program operation display screen generated, on the display unit 31. Note that the program operation display processing unit 34 stores the control program the same as the control program executed by the device control unit 21.

Figure 3:
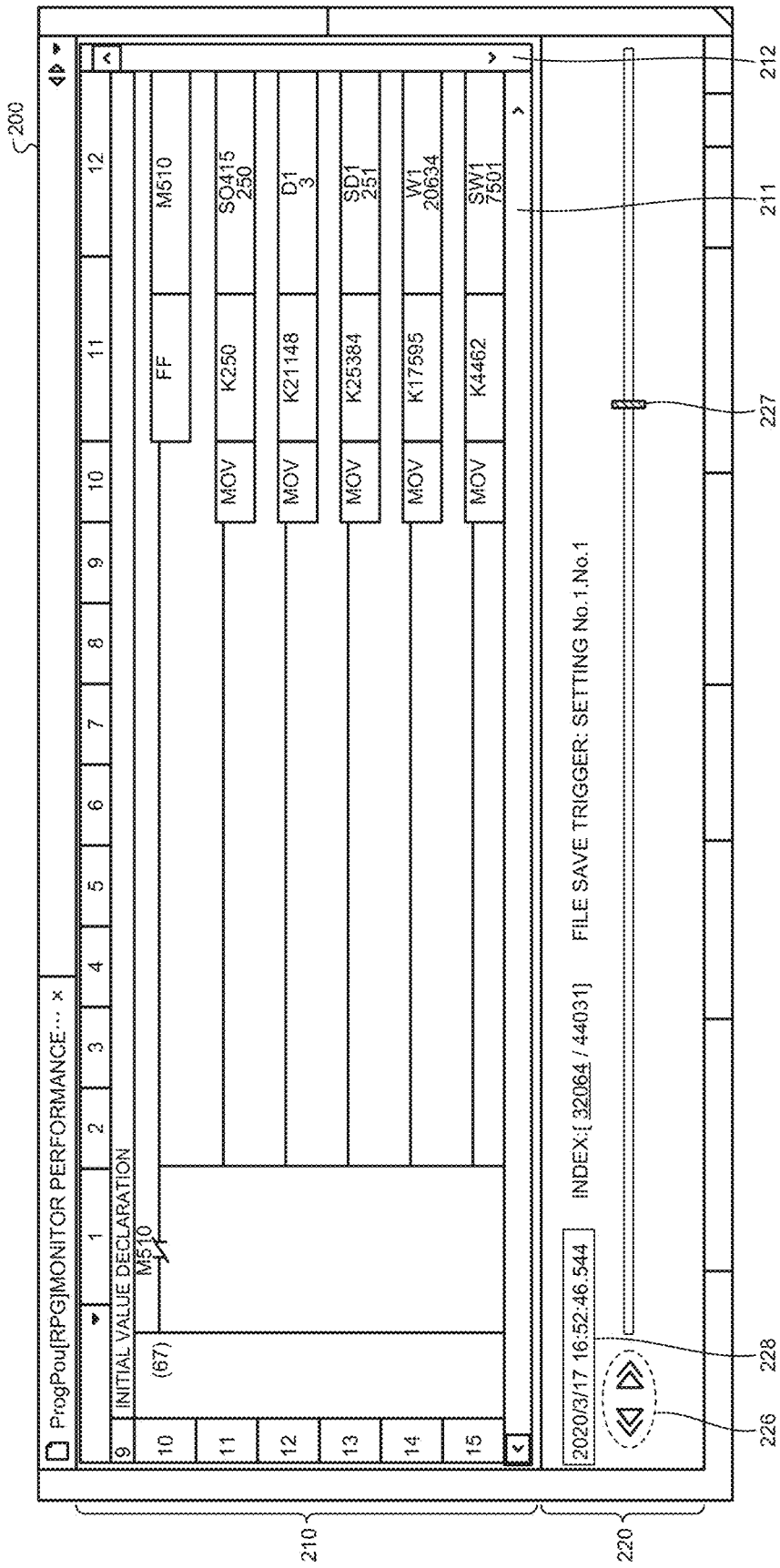
FIG. 3 is a diagram illustrating an example of program operation display screen according to the first embodiment.

FIG. 3 is a diagram illustrating an example of the program operation display screen according to the first embodiment. A program operation display screen 200 includes a program operation display area 210 for displaying the ladder program and a time control area 220 for receiving an operation for the time of the situation to be displayed in the program operation display area 210.

The program operation display area 210 displays the program that has been read, in a form of a ladder program, that is, in circuit diagram form. The program operation display area 210 typically cannot display the entire ladder program. The program operation display area 210 accordingly includes a horizontal scroll bar 211 for horizontally moving the displayed area and a vertical scroll bar 212 for vertically moving the displayed area.

The time control area 220 is an area for displaying the time of reproduction of the program displayed in the program operation display area 210 and operation buttons relating to regeneration of the program. The time control area 220 includes regeneration control buttons 226 for receiving an operation relating to regeneration of operation of a circuit in the program operation display area 210, and a slider 227, which indicates an approximate position of the regeneration time and allows specification of any regeneration time. The situation at the time corresponding to the position of the slider 227 is displayed in the program operation display area 210. The time control area 220 also includes a time display portion 228, which displays the time of the program currently being regenerated in the program operation display area 210. The slider 227 is an example of time specification unit.

Returning to the description referring to FIG. 1, the waveform display processing unit 35 displays, on the display unit 31, the state of the operational part and the input-output data of a control signal based on the log data using a waveform over time. Specifically, the waveform display processing unit 35 generates a waveform display screen, in which a value of input-output data to and from the control object 10 or a value of state data of the operational part included in the log data is plotted over time, and displays the waveform display screen generated, on the display unit 31

Figure 4:
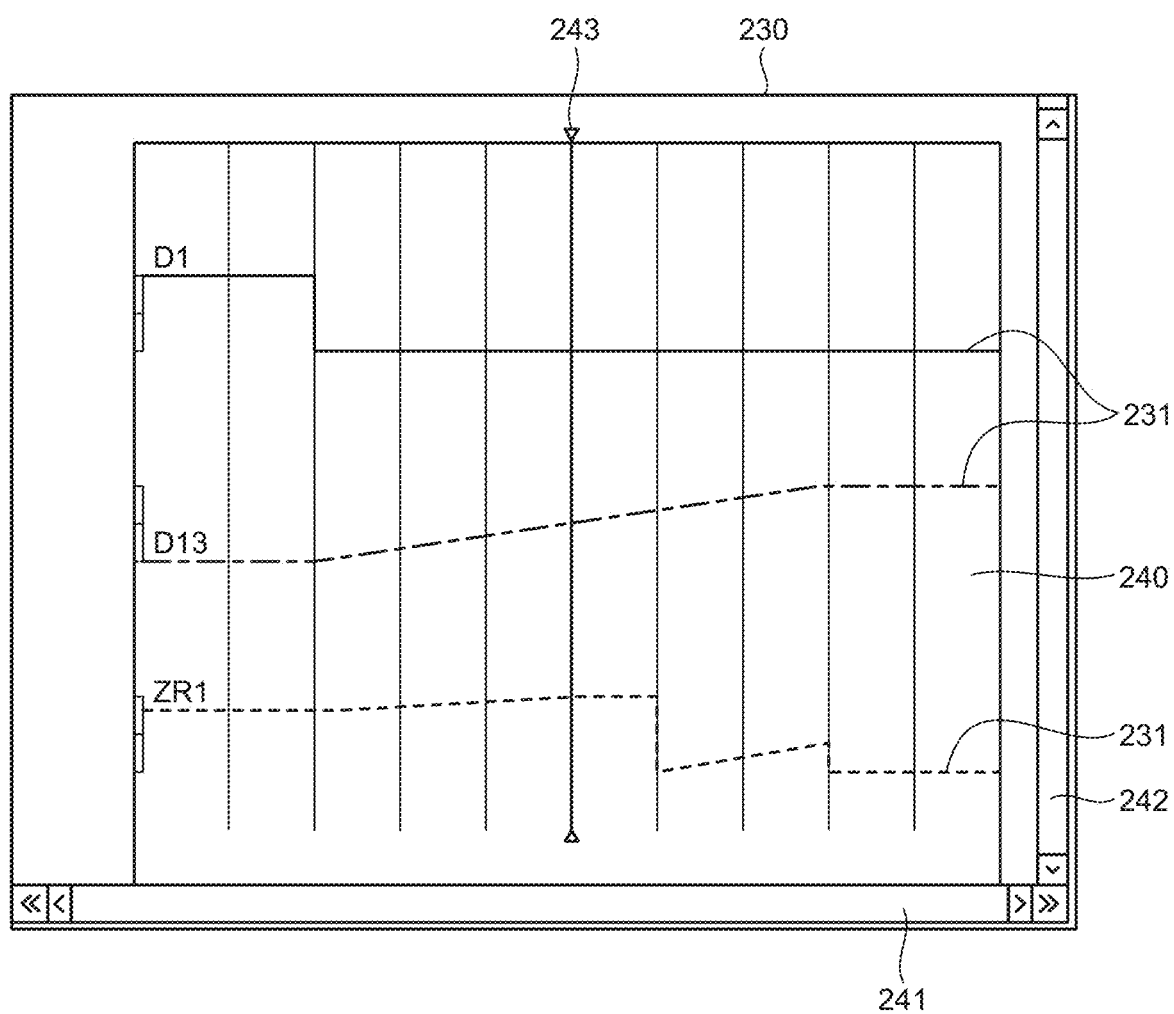
FIG. 4 is a diagram illustrating an example of waveform display screen according to the first embodiment.

FIG. 4 is a diagram illustrating an example of the waveform display screen according to the first embodiment. A waveform display screen 230 includes a waveform display area 240 for displaying sets of waveform data 231. The waveform display area 240 displays waveform data 231 of each of input-output data to and from the control object 10 and the state data of the operational part included in the log data. The waveform display area 240 typically cannot display the entire waveform data 231 of the input-output data and of the state data, and thus the waveform display area 240 includes a horizontal scroll bar 241 for horizontally moving the displayed area and a vertical scroll bar 242 for vertically moving the displayed area. The time axis, which is the horizontal axis for the multiple sets of the waveform data 231, represents a common time range. The waveform display area 240 includes a cursor 243 representing time. The cursor 243 crosses the multiple vertically-arranged sets of the waveform data 231, and is movable along the time axis direction. The cursor 243 is an example of time specification unit. The cursor 243 allows the user to specify any time.

Returning to the description referring to FIG. 1, the video display processing unit 36 displays video data generated by imaging of the state of the control object 10, on the display unit 31. Specifically, the video display processing unit 36 generates a video display screen for regenerating and displaying video data according to the format of the video data recorded in the video recording unit 23, and displays the video display screen generated, on the display unit 31.

Figure 5:
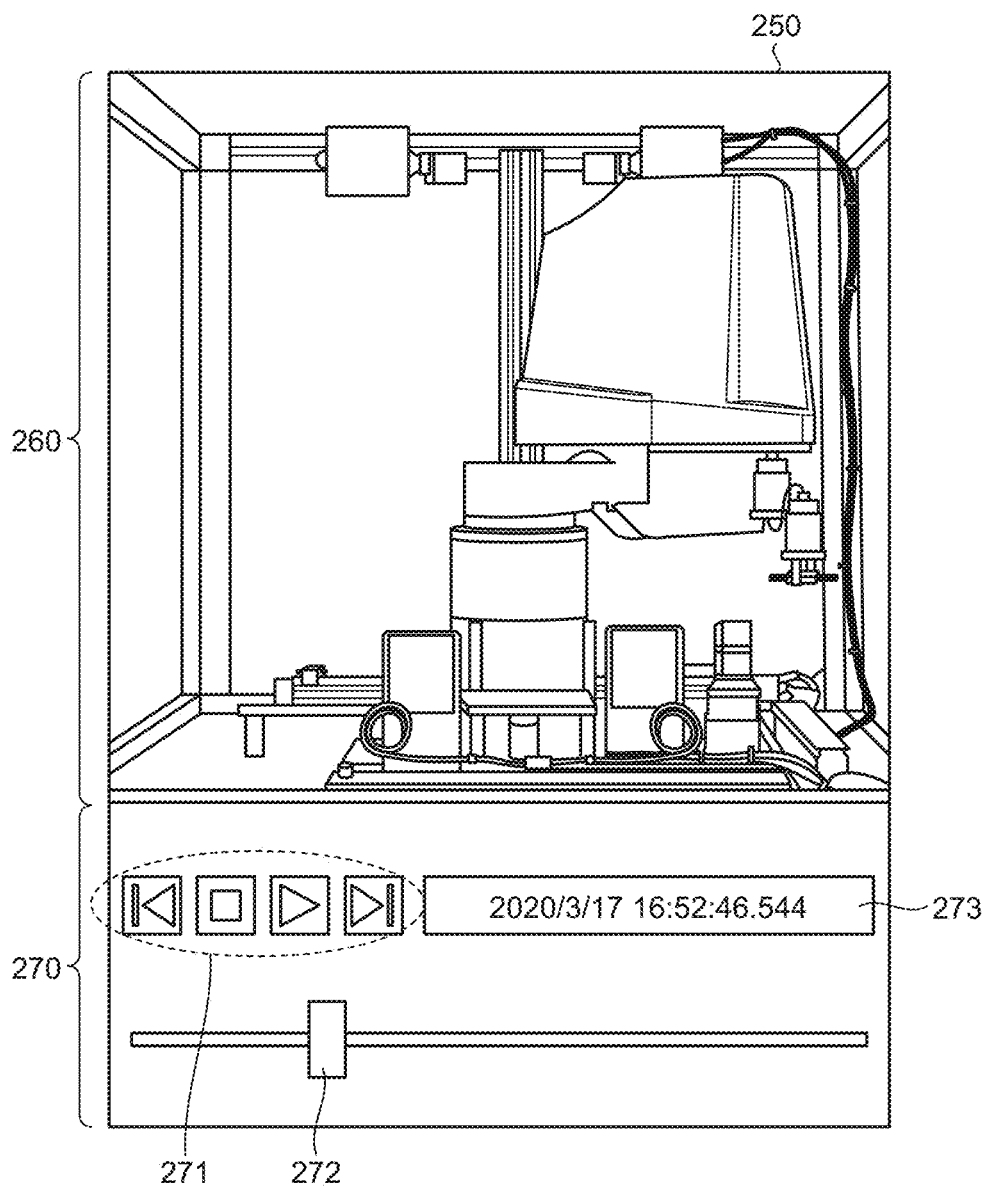
FIG. 5 is a diagram illustrating an example of video display screen according to the first embodiment.

FIG. 5 is a diagram illustrating an example of the video display screen according to the first embodiment. A video display screen 250 includes a video display area 260 and a time control area 270. Video data is regenerated in the video display area 260. The time control area 270 is an area for receiving an operation relating to regeneration of video data regenerated in the video display area 260, and is an area for displaying the regeneration time of the video data regenerated in the video display area 260. The time control area 270 includes operation buttons 271 relating to regeneration of the video data in the video display area 260, and a slider 272, which indicates an approximate position of the regeneration time and allows specification of any regeneration time. The situation at the time corresponding to the position of the slider 272 is displayed in the video display area 260. The time control area 270 also includes a time display portion 273, which displays the time of the video data currently being regenerated. The slider 272 is an example of time specification unit.

Returning to the description referring to FIG. 1, the action reproduction unit 37 generates action reproduction simulation data, which is a result of causing a virtual control object corresponding to the control object 10 to reproduce an action based on the log data. Specifically, the action reproduction unit 37 creates a virtual control object configured the same as the control object 10 on the computer, and generates action reproduction simulation data, which represents a reproduction of an action on the virtual control object based on the log data. That is, the action reproduction unit 37 simulates an action on the virtual control object using the log data. The action reproduction simulation data is data having a format enabling three-dimensional rendering of the virtual control object, and allows the virtual control object to be rendered in any direction by specifying an angle. It is sufficient that the virtual control object reproduce a main part of the control object 10. However, when the virtual control object is configured the same as the control object 10 to detail, simulation performed by the action reproduction unit 37 will generate a result closer to an actual result.

The display setting information storage unit 38 stores setting information representing a viewpoint position at which the virtual control object is displayed as three-dimensional data on the display unit 31. Specifically, the display setting information storage unit 38 stores display setting information representing the setting of the viewpoint position for use when three-dimensional data of the virtual control object that is a three-dimensional representation of the action reproduction simulation data is to be displayed on the display unit 31. In one example, the viewpoint position for rendering the three-dimensional data of the virtual control object is predetermined as a default value. The viewpoint position may be rotated on a horizontal plane by an angle specified by the user, and the viewpoint position may be rotated on a vertical plane by an angle specified by the user with the position of the virtual control object kept fixed. The angle of rotation of the viewpoint position on a horizontal plane is herein referred to as azimuth angle, and the angle of rotation of the viewpoint position on a vertical plane is herein referred to as polar angle. The display angle including the azimuth angle and the polar angle input by the user using an input unit (not illustrated) serves as the display setting information, and is stored in the display setting information storage unit 38. The display setting information storage unit 38 stores, by default, display setting information including a predetermined display angle.

Note that the display setting information storage unit 38 may specify an area of the control object 10 to be displayed in addition to the display angle. The display setting information may include, by way of example, the position and a magnification factor of the virtual control object to display an enlarged view of a portion thereof specified by the user, in addition to the display angle.

The three-dimensional data display processing unit 39 displays the action reproduction simulation data on the display unit 31 as three-dimensional data. Specifically, the three-dimensional data display processing unit 39 generates a three-dimensional data display screen, which three-dimensionally displays, based on the display setting information, the action reproduction simulation data generated by the action reproduction unit 37, and displays the three-dimensional data display screen generated, on the display unit 31. In this operation, the three-dimensional data display processing unit 39 obtains the display setting information from the display setting information storage unit 38 to generate the three-dimensional data display screen displaying the action reproduction simulation data according to the viewpoint position for displaying the virtual control object, specified in the display setting information.

Figure 6:
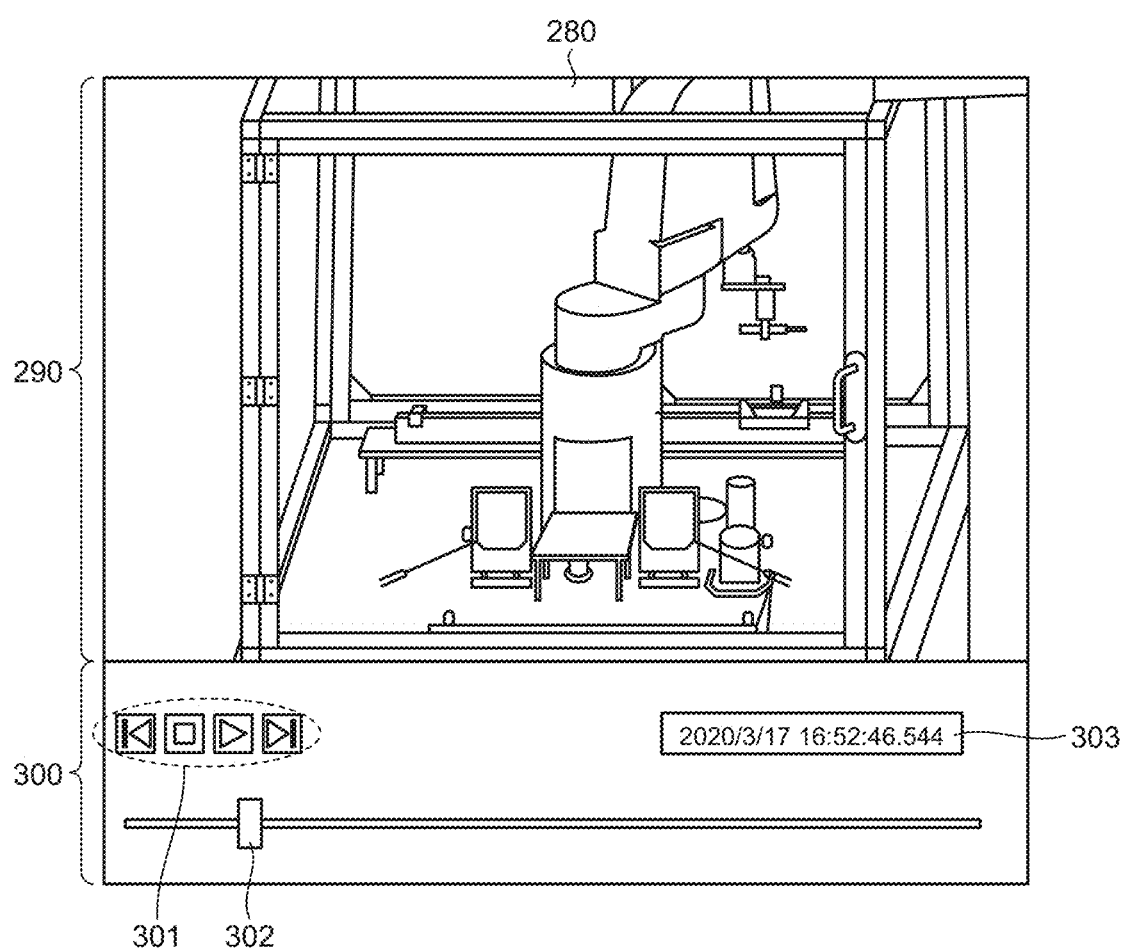
FIG. 6 is a diagram illustrating an example of three-dimensional data display screen according to the first embodiment.

FIG. 6 is a diagram illustrating an example of the three-dimensional data display screen according to the first embodiment. A three-dimensional data display screen 280 includes a three-dimensional data display area 290 and a time control area 300. The three-dimensional data display area 290 regenerates three-dimensional data that is a three-dimensional representation of the action reproduction simulation data. The time control area 300 is an area for receiving an operation relating to regeneration of the three-dimensional data regenerated in the three-dimensional data display area 290, and is an area for displaying the regeneration time of the three-dimensional data regenerated in the three-dimensional data display area 290. The time control area 300 includes operation buttons 301 relating to regeneration of the three-dimensional data in the three-dimensional data display area 290, and a slider 302, which indicates an approximate position of the regeneration time and allows specification of any regeneration time. The situation at the time corresponding to the position of the slider 302 is displayed in the three-dimensional data display area 290. The time control area 300 also includes a time display portion 303, which displays the time of the video data currently being regenerated. The slider 302 is an example of time specification unit.

When one of the time specification units of the program operation display screen 200, the waveform display screen 230, the video display screen 250, and the three-dimensional data display screen 280 is operated, the time acquisition unit 40 obtains the specified time, which is the time specified using the operated one of the time specification units, and provides the specified time to the time synchronization unit 33. Acquisition of the specified time using one of the time specification units, i.e., one of the cursor 243 and the sliders 227, 272, and 302, is provided by a known image display technology.

When the specified time is provided from the time acquisition unit 40, the time synchronization unit 33 provides the log data for the time provided, to the action reproduction unit 37, to the program operation display processing unit 34, and to the waveform display processing unit 35, and provides the video data to the video display processing unit 36. This causes the action reproduction unit 37 to generate action reproduction simulation data for the time provided, and to display three-dimensional data on the three-dimensional data display processing unit 39. In addition, the program operation display processing unit 34 and the waveform display processing unit 35 respectively display the program and the waveform data 231 for the time provided, and the video display processing unit 36 displays the video data for the time provided. This causes the three-dimensional data displayed by the three-dimensional data display processing unit 39, the circuit displayed by the program operation display processing unit 34, the waveform data 231 displayed by the waveform display processing unit 35, and the video data displayed by the video display processing unit 36 to be synchronized with one another.

Note that although FIG. 1 illustrates the malfunction analysis support apparatus 30 as including the program operation display processing unit 34, the waveform display processing unit 35, and the video display processing unit 36, inclusion of at least one display processing unit of the program operation display processing unit 34, the waveform display processing unit 35, and the video display processing unit 36 is sufficient. In this case, when the time of the three-dimensional data to be displayed by the three-dimensional data display processing unit 39 or the time of the data to be displayed by a processing unit that is the at least one display processing unit of the program operation display processing unit 34, the waveform display processing unit 35, and the video display processing unit 36 is specified, the time acquisition unit 40 obtains the time specified as the specified time, and outputs the specified time to the time synchronization unit 33. The time synchronization unit 33 provides the log data corresponding to the specified time to the action reproduction unit 37, and provides the log data or the video data corresponding to the specified time to the at least one processing unit of the program operation display processing unit 34, the waveform display processing unit 35, and the video display processing unit 36. That is, the time synchronization unit 33 synchronizes time between the three-dimensional data reproduced by the action reproduction unit 37 and to be displayed by the three-dimensional data display processing unit 39 and the data to be displayed by the at least one processing unit of the program operation display processing unit 34, the waveform display processing unit 35, and the video display processing unit 36.

Figure 7:
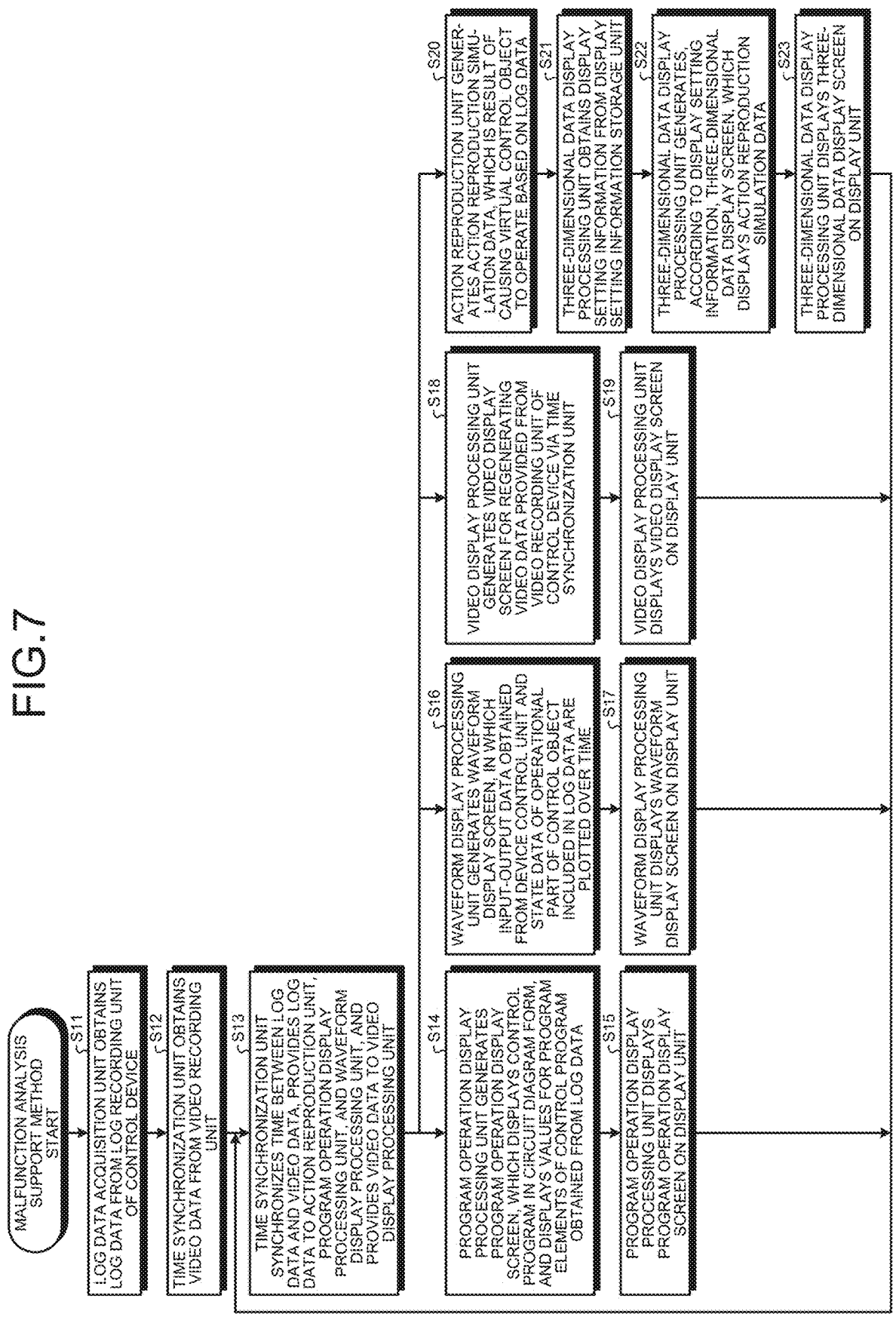
FIG. 7 is a flowchart illustrating an example of procedure of a malfunction analysis support method according to the first embodiment.

A malfunction analysis support method for use in the malfunction analysis support system 1 will next be described. FIG. 7 is a flowchart illustrating an example of procedure of a malfunction analysis support method according to the first embodiment. It is assumed here that the user operates the control device 20, that the log recording unit 22 records the log data, and that the video recording unit 23 records the video data.

The user of the malfunction analysis support apparatus 30 instructs the malfunction analysis support apparatus 30 to perform a malfunction analysis support method by an operation using an input unit (not illustrated). This causes the log data acquisition unit 32 to obtain log data from the log recording unit 22 of the control device 20 (step S11).

Then, the time synchronization unit 33 obtains video data from the video recording unit 23 (step S12), synchronizes time between the log data and the video data, provides the log data to the action reproduction unit 37, to the program operation display processing unit 34, and to the waveform display processing unit 35, and provides the video data to the video display processing unit 36 (step S13).

The program operation display processing unit 34 includes a control program pre-installed that is the same as the control program executed by the device control unit 21 of the control device 20, and using this control program and the log data, displays the situation of operation of the actual control program. The program operation display processing unit 34 generates the program operation display screen 200, which displays the control program in circuit diagram form, and displays values for the program elements of the control program obtained from the log data (step S14). Then, the program operation display processing unit 34 displays the program operation display screen 200 on the display unit 31 (step S15).

The waveform display processing unit 35 generates the waveform display screen 230, in which the input-output data obtained from the device control unit 21 and the state data of the operational part of the control object 10, included in the log data, are plotted over time (step S16), and displays the waveform display screen 230 on the display unit 31 (step S17). The waveform display screen 230 displays a signal status of the input-output data in the device control unit 21 in the log data, and displays an action state of the operational part. The cursor 243 is also provided at the position of the time provided, in the waveform display screen 230.

The video display processing unit 36 generates the video display screen 250 for regenerating the video data provided from the video recording unit 23 of the control device 20 via the time synchronization unit 33 (step S18), and displays the video display screen 250 on the display unit 31 (step S19).

The action reproduction unit 37 includes three-dimensional data of the virtual control object pre-installed that is configured the same as the control object 10, and using this three-dimensional data and the log data, performs simulation processing that causes the virtual control object to reproduce an action. Then, the action reproduction unit 37 generates action reproduction simulation data, which is a result of causing the virtual control object to operate based on the log data (step S20). The action reproduction unit 37 reproduces an action on the virtual control object using the log data for a different time provided from the time synchronization unit 33.

The three-dimensional data display processing unit 39 obtains display setting information from the display setting information storage unit 38 (step S21), and according to the display setting information, generates the three-dimensional data display screen 280, which displays the action reproduction simulation data (step S22). The three-dimensional data display processing unit 39 generates the three-dimensional data display screen 280 as viewed from a viewpoint position that has been moved by an azimuth angle and by a polar angle set by default or set by the user relative to the direction of the viewpoint position preset for the control object 10. The action reproduction simulation data generated by the action reproduction unit 37 is three-dimensional data; therefore, when the action reproduction simulation data is displayed, the viewpoint position toward the control object 10 can be in any direction. Then, the three-dimensional data display processing unit 39 displays the three-dimensional data display screen 280 on the display unit 31 (step S23).

Display of the program operation display screen 200 at step S15, display of the waveform display screen 230 at step S17, display of the video display screen 250 at step S19, and display of the three-dimensional data display screen 280 at step S23 are synchronized in time with one another.

After steps S15, S17, S19, and S23, the process returns to step S13, and the foregoing operations are repeated. This causes the program operation display screen 200, the waveform display screen 230, the video display screen 250, and the three-dimensional data display screen 280 to be displayed over time on the display unit 31. That is, in synchronization with the video display screen 250 regenerated by the video display processing unit 36, the program operation display screen 200 displays the situation of operation of the program, and the waveform display processing unit 35 displays the signal status of the input-output data and the action state of the operational part. In addition, the three-dimensional data display processing unit 39 displays a result of simulation that has caused a virtual control object on the computer to reproduce an action based on the log data. The user can analyze the portion of malfunction of the control object 10 by viewing these display screens.

Figure 8:
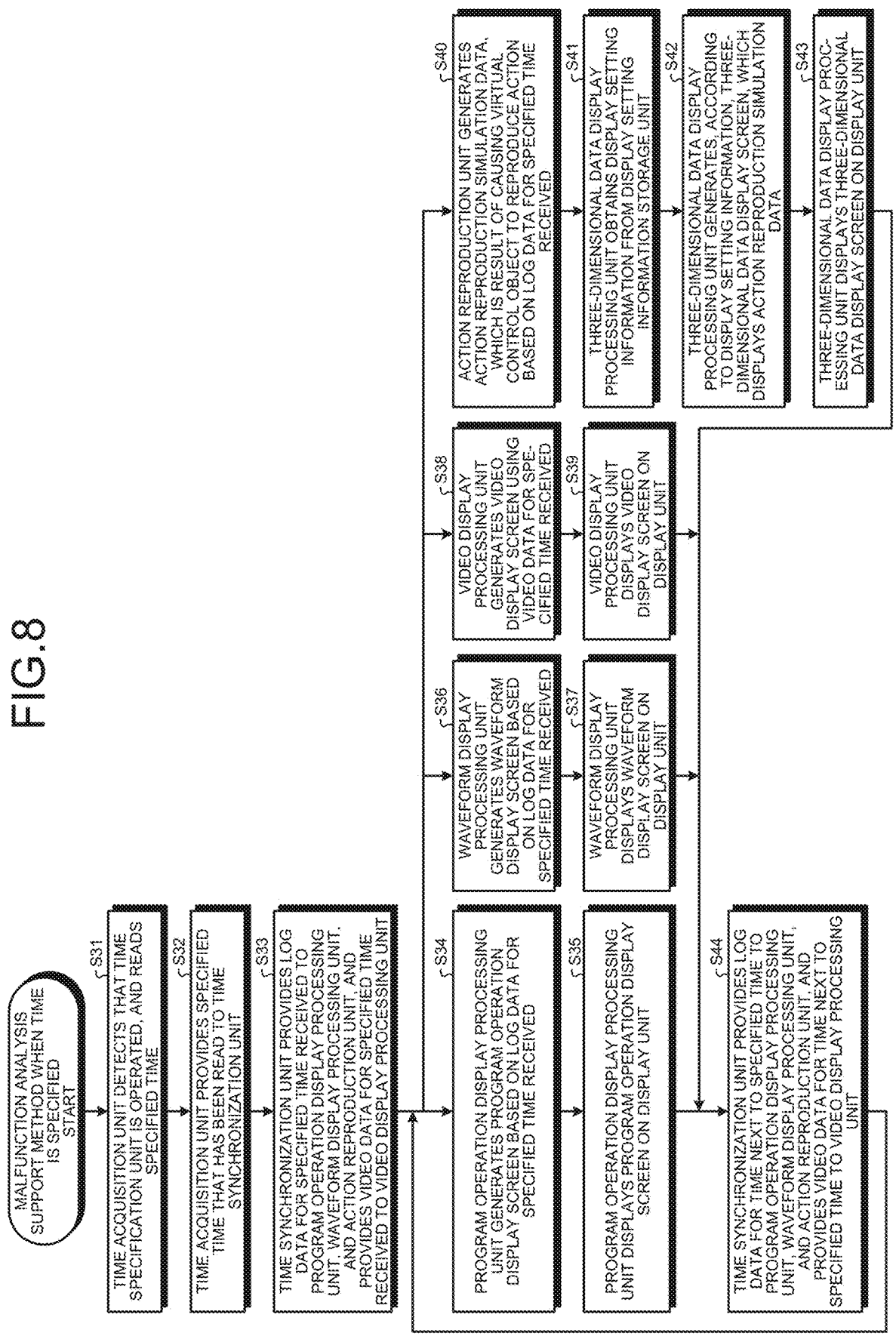
FIG. 8 is a flowchart illustrating an example of procedure of the malfunction analysis support method when a time is specified, according to the first embodiment.

An operation will next be described of when the user specifies time on one of the program operation display screen 200, the waveform display screen 230, the video display screen 250, and the three-dimensional data display screen 280. FIG. 8 is a flowchart illustrating an example of procedure of a malfunction analysis support method when a time is specified, according to the first embodiment. It is assumed here that the display unit 31 is currently displaying the program operation display screen 200, the waveform display screen 230, the video display screen 250, and the three-dimensional data display screen 280 according to the process illustrated in FIG. 7.

First, the user operates the time specification unit of one of the program operation display screen 200, the waveform display screen 230, the video display screen 250, and the three-dimensional data display screen 280. The time specification unit here is one of the sliders 227, 272, and 302 and the cursor 243. The time acquisition unit 40 detects that a time specification unit is operated, reads the specified time (step S31), and provides the specified time read, to the time synchronization unit 33 (step S32).

The time synchronization unit 33 provides the log data for the specified time received, to the program operation display processing unit 34, to the waveform display processing unit 35, and to the action reproduction unit 37, and provides the video data for the specified time received, to the video display processing unit 36 (step S33).

The program operation display processing unit 34 generates the program operation display screen 200 based on the log data for the specified time received (step S34), and displays the program operation display screen 200 on the display unit 31 (step S35). The waveform display processing unit 35 generates the waveform display screen 230 based on the log data for the specified time received (step S36), and displays the waveform display screen 230 on the display unit 31 (step S37). The video display processing unit 36 generates the video display screen 250 using the video data for the specified time received (step S38), and displays the video display screen 250 on the display unit 31 (step S39).

The action reproduction unit 37 generates the action reproduction simulation data, which is a result of causing the virtual control object to reproduce an action based on the log data for the specified time received (step S40).

The three-dimensional data display processing unit 39 obtains the display setting information from the display setting information storage unit 38 (step S41), and according to the display setting information, generates the three-dimensional data display screen 280, which displays the action reproduction simulation data (step S42). The three-dimensional data display processing unit 39 then displays the three-dimensional data display screen 280 on the display unit 31 (step S43).

Thereafter, the time synchronization unit 33 provides the log data for the time next to the specified time to the program operation display processing unit 34, to the waveform display processing unit 35, and to the action reproduction unit 37, and provides the video data for the time next to the specified time to the video display processing unit 36 (step S44). The process then proceeds to steps S34, S36, S38, and S40. Then, the foregoing operation of reproducing the action states is repeated.

A specific example of the malfunction analysis support method for use in the malfunction analysis support system 1 according to the first embodiment will next be described. An example is herein provided in which a malfunction of the control object 10, which is the facility illustrated in FIG. 2, is to be analyzed. It is also assumed here that the malfunction analysis support apparatus 30 is configured not to include the program operation display processing unit 34 or the video display processing unit 36.

Figure 9:
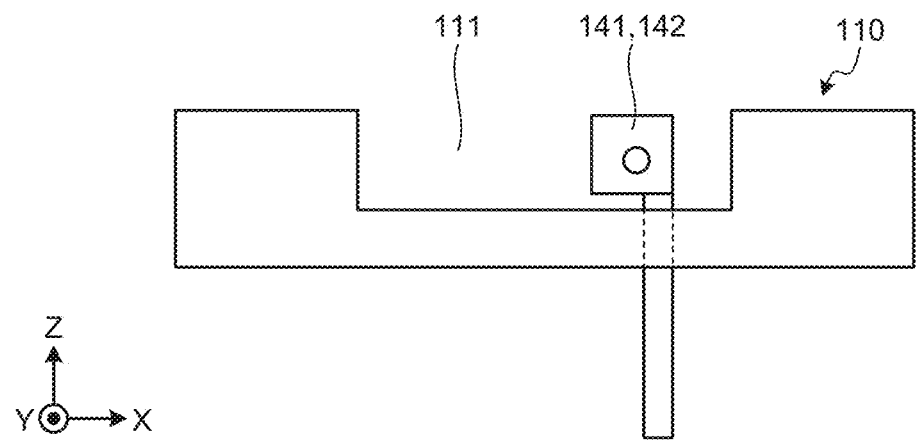
FIG. 9 is a side view illustrating an example of a receiving tray used in the facility illustrated in FIG. 2.

FIG. 9 is a side view illustrating an example of a receiving tray used in the facility illustrated in FIG. 2. In relation to the receiving tray 110, X-direction is the moving direction of the receiving tray 110, Z-direction is the vertical direction, and Y-direction is perpendicular to both X-direction and Z-direction. In the facility illustrated in FIG. 2, the receiving tray 110 has a recessed portion 111 on which the workpiece 100 is placeable. As illustrated in FIG. 2, the light-emitting elements 141A and 142A and the light-receiving elements 141B and 142B are disposed at both ends in Y-direction across the receiving tray 110 at the first position 121 and at the second position 122. The sensors 141 and 142 are provided to detect the workpiece 100, and the recessed portion 111 is provided to prevent interruption of the optical path between the sensors 141 and 142 by a member of the receiving tray 110. In this example, the recessed portion 111 is formed in a trench extending along Y-direction. That is, the optical path between the sensors 141 and 142 extends in the recessed portion 111 at the first position 121 and at the second position 122.

Figure 10:
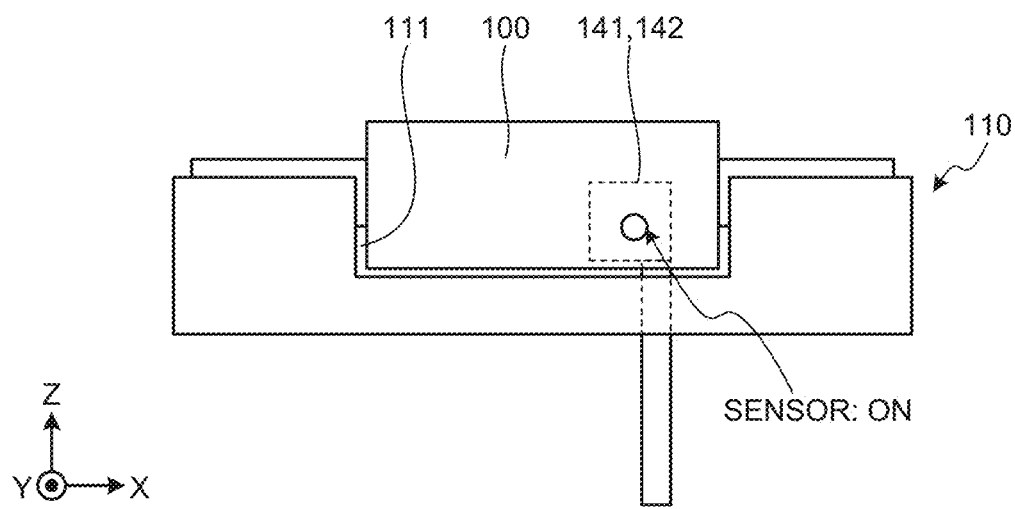
FIG. 10 is a side view illustrating an example of a situation in which a workpiece is placed correctly on the receiving tray used in the facility illustrated in FIG. 2.

FIG. 10 is a side view illustrating an example of a situation in which a workpiece is placed correctly on the receiving tray used in the facility illustrated in FIG. 2. When the receiving tray 110 is positioned at the first position 121 or at the second position 122, and the workpiece 100 is placed correctly on the receiving tray 110, the workpiece 100 lies in the optical path between the sensors 141 and 142. That is, the light-receiving element 141B or 142B of the sensor 141 or 142 does not receive light from the light-emitting element 141A or 142A, which causes the sensor 141 or 142 to determine that the workpiece 100 is positioned correspondingly at the first position 121 or at the second position 122. Otherwise, during a time period in which the light-receiving element 141B or 142B continuously receives light from the light-emitting element 141A or 142A, the workpiece 100 is determined not to be positioned correspondingly at the first position 121 or at the second position 122.

The facility illustrated in FIG. 2 performs operation from a first step through seventh step described below.

First step: the receiving tray 110 on which the workpiece 100 is placed is moved to the first position 121.

Second step: upon detection of the workpiece 100, the sensor 141 outputs an On signal.

Third step: when the sensor 141 outputs an On signal, the robot hand 133 of the robot hand mechanism 130 grasps the workpiece 100 at the first position 121.

Fourth step: the receiving tray 110 is moved from the first position 121 to the second position 122.

Fifth step: the robot hand mechanism 130 rotates, the workpiece 100 is inspected by the inspection unit 150, and the workpiece 100 is then conveyed to the second position 122, where the workpiece 100 is placed onto the receiving tray 110 at the second position 122.

Sixth step: when the workpiece 100 is placed on the receiving tray 110, causing the sensor 142 to detect the workpiece 100, the sensor 142 outputs an On signal.

Seventh step: when the sensor 142 outputs an On signal, the robot hand mechanism 130 rotates to return the robot hand 133 to the first position 121.

Assume here that the log recording unit 22 records, as log data, input signals from the sensor 141 and from the sensor 142, and the angle of the shaft 131, which is the spindle of the robot hand mechanism 130, in a time sequence. Note that the value of the angle of the shaft 131 is not given in degrees, but in a relative value ranging from 0 for when the robot hand 133 of the robot hand mechanism 130 is at the first position 121 to 100 for when the robot hand 133 is at the second position 122. The angle of the shaft 131 is hereinafter referred to as shaft angle.

FIG. 11 is a diagram illustrating an example of the log data when the facility is in a normal condition. As illustrated in FIG. 11, the log data in this case includes time, the value of the sensor 141, the value of the sensor 142, and the shaft angle. Note that an On state is represented by "1", and an Off state is represented by "0" for the sensors 141 and 142.

Figure 12:
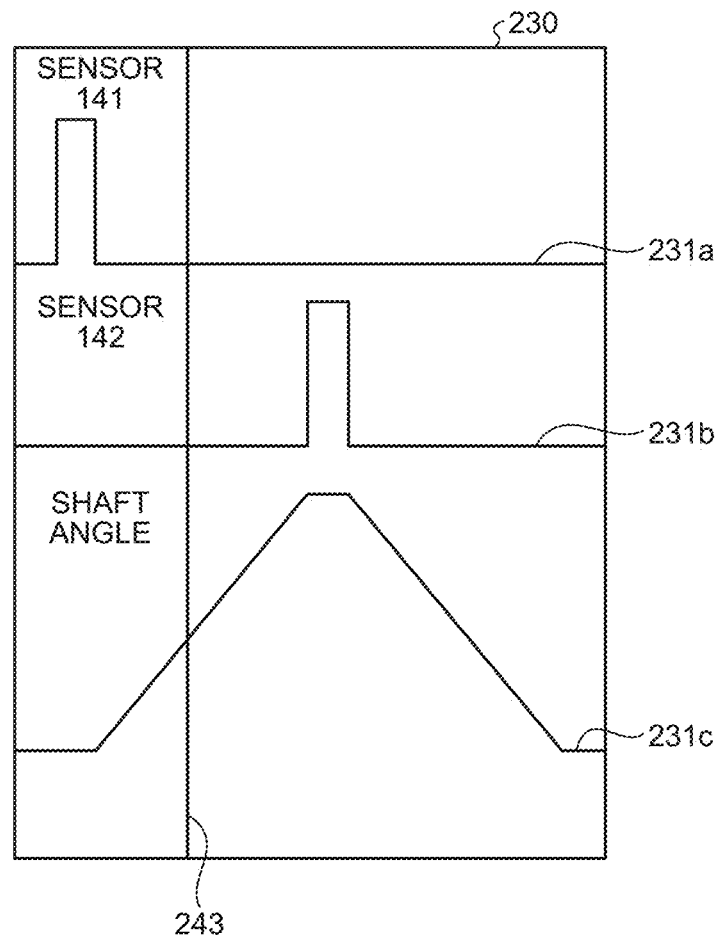
FIG. 12 is a diagram illustrating an example of waveform display screen generated based on the log data of FIG. 11.

FIG. 12 is a diagram illustrating an example of the waveform display screen generated based on the log data of FIG. 11. The waveform display screen 230 of FIG. 12 displays three sets of waveform data 231a, 231b, and 231c and the cursor 243. The waveform data 231a is a waveform representing the signal status of the sensor 141, and the waveform data 231b is a waveform representing the signal status of the sensor 142. The waveform data 231c is a waveform of the shaft angle. The horizontal axes of these waveforms represent time.

In a normal condition, the facility operates as illustrated by the waveform data 231a, 231b, and 231c of FIG. 12. When the sensor 141 changes to an On state at the first position 121, the robot hand mechanism 130 rotates to the second position 122, and stops rotation at the second position 122. When the sensor 142 changes to an On state at the second position 122, the robot hand mechanism 130 rotates to the first position 121 in the opposite direction, and stops rotation at the first position 121.

Figure 13:
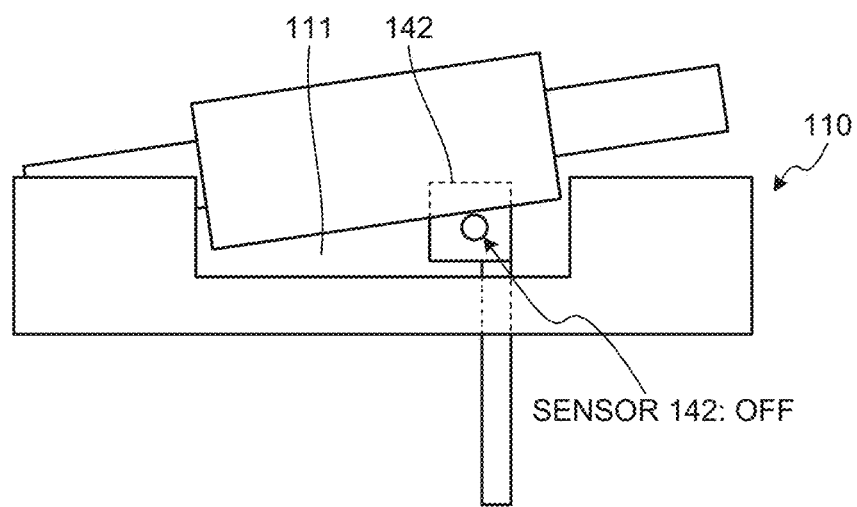
FIG. 13 is a diagram illustrating an example of how the workpiece is being placed on the receiving tray when a malfunction has occurred in the facility.

Assume now that a malfunction has occurred in the fifth step when the robot hand 133 of the robot hand mechanism 130 places the workpiece 100 onto the receiving tray 110. FIG. 13 is a diagram illustrating an example of how the workpiece is being placed on the receiving tray when a malfunction has occurred in the facility. In FIG. 13, the receiving tray 110 is incorrectly positioned at the second position 122, thereby causing the workpiece 100 to be placed on the receiving tray 110 without fitting into the recessed portion 111 of the receiving tray 110. This prevents the optical path of the sensor 142 from being interrupted by the workpiece 100. That is, the sensor 142 does not detect that the workpiece 100 is placed, and the sensor 142 thus continuously detects an OFF state.

Figure 15:
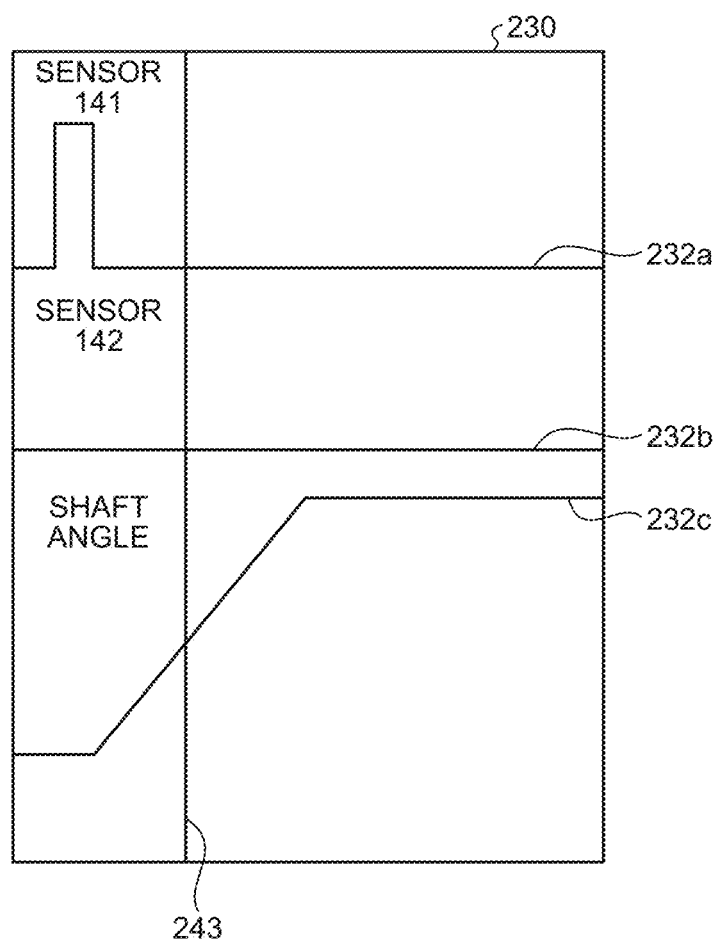
FIG. 15 is a diagram illustrating an example of waveform display screen generated based on the log data of FIG. 14.

FIG. 14 is a diagram illustrating an example of the log data when a malfunction has occurred in the facility. FIG. 15 is a diagram illustrating an example of the waveform display screen generated based on the log data of FIG. 14. The waveform display screen 230 of FIG. 15 displays three sets of waveform data 232a, 232b, and 232c and the cursor 243. The waveform data 232a is a waveform representing the signal status of the sensor 141, and the waveform data 232b is a waveform representing the signal status of the sensor 142. The waveform data 232c is a waveform of the shaft angle. The horizontal axes of these waveforms represent time.

In a normal condition, the sensor 142 would change to an On state at the time "11:11:17" and "11:11:18" corresponding to the sixth step, but the sensor 142 is in an Off state in FIGS. 14 and 15. This causes the robot hand mechanism 130 to thereafter be kept at the position of the value "100" of the shaft angle at the second position 122.

Next, the user inspects the malfunction event. The user inputs an instruction to check the log data, or the like, through an input unit (not illustrated) of the malfunction analysis support apparatus 30 to start a malfunction analysis support method.

The log data acquisition unit 32 obtains the log data from the log recording unit 22 of the control device 20. It is desirable, in this operation, that the log data acquisition unit 32 obtain log data for a time period around when the malfunction occurred. The time synchronization unit 33 provides the log data to the waveform display processing unit 35 and to the action reproduction unit 37. The waveform display processing unit 35 generates, according to the log data, the waveform display screen 230 illustrated in FIG. 15 including the waveform data 232a, 232b, and 232c of the sensor 141, of the sensor 142, and of the shaft angle, and displays the waveform display screen 230 on the display unit 31. The action reproduction unit 37 generates action reproduction simulation data, which is a result of causing a virtual control object configured the same as the facility illustrated in FIG. 2 to operate based on the log data. The three-dimensional data display processing unit 39 generates the three-dimensional data display screen 280 including three-dimensional data as viewed from a viewpoint position moved according to the display setting information specified, the viewpoint position being used for displaying the action reproduction simulation data of the virtual control object, and displays the three-dimensional data display screen 280 on the display unit 31. In this operation, the time of the virtual control object displayed on the three-dimensional data display screen 280 and the time of the time specification portion displayed on the waveform display screen 230 are synchronized with each other.

Figure 16:
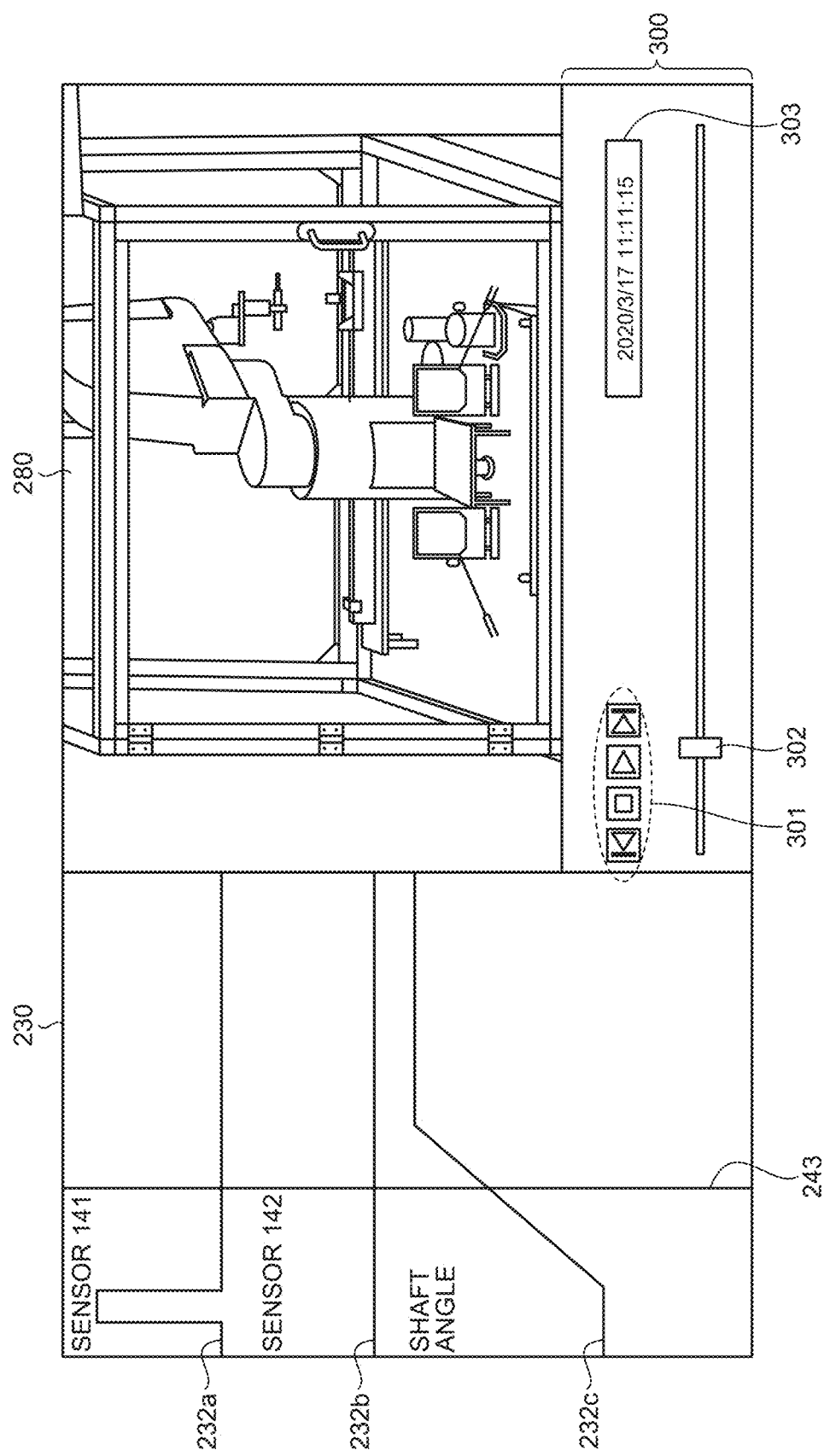
FIG. 16 is a diagram schematically illustrating an example of the waveform display screen and of the three-dimensional data display screen in the malfunction analysis support apparatus according to the first embodiment.

FIG. 16 is a diagram schematically illustrating an example of the waveform display screen and of the three-dimensional data display screen in the malfunction analysis support apparatus according to the first embodiment. As illustrated in FIG. 16, the display unit 31 is displaying the waveform display screen 230 and the three-dimensional data display screen 280. The waveform display screen 230 displays the waveform data 232a, 232b, and 232c and the cursor 243 representing the time on the waveform data 232a, 232b, and 232c illustrated in FIG. 15. The three-dimensional data display screen 280 displays a three-dimensional figure, which is a result of simulation of the action state of the virtual control object at a specific time. As described above, the specific time of the three-dimensional data display screen 280 corresponds to the time at the position of the cursor 243 of the waveform display screen 230.

In one example, the user specifies a desired reproduction time by moving the cursor 243 of the waveform display screen 230 of FIG. 16. The time acquisition unit 40 obtains the time corresponding to the position of the cursor 243 of the waveform display screen 230. Assume here that the hatched time in the log data of FIG. 14, that is, "11:11:15" is obtained. The time acquisition unit 40 notifies the obtained time to the time synchronization unit 33, and the time synchronization unit 33 provides the log data for the obtained time to the action reproduction unit 37. The action reproduction unit 37 then generates action reproduction simulation data, which is a result of causing the virtual control object to operate using the log data for the obtained time, and the three-dimensional data display processing unit 39 displays the three-dimensional data display screen 280, which three-dimensionally displays the action reproduction simulation data, on the display unit 31. This enables the user to check, in the three-dimensional data display screen 280, the condition of the control object 10 at the time specified on the waveform display screen 230.

When the user specifies a next time, the screens generated by the waveform display processing unit 35 and by the three-dimensional data display processing unit 39, synchronized with each other, are displayed on the display unit 31 in a similar manner. Note that time may thereafter be put forward not by user specification but automatically. Note that also in such case, the foregoing operation is applied without any change.

Repetition of the foregoing operation allows the user to see the conditions at each time of both the display of the waveform data based on the log data and the display of the three-dimensional data of the control object 10 to inspect the status cause of a malfunction.

Note that the foregoing example has been described as an example of specifying the regeneration time using the waveform display processing unit 35, but it is possible to check the waveform data and the action of the virtual control object through operation similar to the foregoing operation also by specifying the regeneration time using the slider 302 of the three-dimensional data display screen 280 of FIG. 16.

In the first embodiment, the time synchronization unit 33 synchronizes time between the log data obtained from the control device 20 and the video data obtained from the video recording unit 23 of the control device 20, and provides the log data and the video data to at least one processing unit of the program operation display processing unit 34, the waveform display processing unit 35, and the video display processing unit 36 and to the action reproduction unit 37. The program operation display processing unit 34 displays the program operation display screen 200, which displays the control program executed by the device control unit 21 of the control device 20 in circuit diagram form, and places values of input-output data or values of state data corresponding to the program elements obtained from the log data for the time specified by the time synchronization unit 33, near the corresponding program elements. The waveform display processing unit 35 displays the waveform display screen 230, which displays a waveform over time of a value of input-output data or of a value of state data, and places the cursor 243 at the time specified by the time synchronization unit 33. The video display processing unit 36 displays video data for the time specified by the time synchronization unit 33 in the video data, in the video display screen 250. The action reproduction unit 37 generates action reproduction simulation data, which represents a reproduction of an action on the virtual control object configured the same as the control object 10 using the log data for the time specified by the time synchronization unit 33. The three-dimensional data display processing unit 39 displays the three-dimensional data display screen 280, which displays the action reproduction simulation data as three-dimensional data. Thus, the three-dimensional data display screen 280 is displayed with at least one screen of the program operation display screen 200, the waveform display screen 230, and the video display screen 250, where in the three-dimensional data display screen 280, an action is reproduced, based on the log data, on the virtual control object synchronized with at least one of the program operation display screen 200, the waveform display screen 230, and the video display screen 250, each of which displays a result of actual action of the control object 10. Providing these screens to the user can then support analysis of a malfunction state of the control object 10 performed by the user.

The three-dimensional data display processing unit 39 is configured to be capable of moving the viewpoint position for rendering the virtual control object on the display unit 31 according to the display setting information in the display setting information storage unit 38. This enables inspection to be performed on an action of the virtual control object from any direction without imaging the control object 10 using multiple imaging units 71. That is, this can provide the user with an environment that allows the overall state and the overall operation of each device to be understood from various perspectives with respect to the manufacturing facility, i.e., the control object 10, and with respect to the units included in the manufacturing facility. This facilitates identification by the user of the cause when a malfunction occurs without an increase in cost for installation of the multiple imaging units 71, thereby leading to early recovery, and enabling improvement in the availability of the manufacturing facility, of a unit, and of a device.

Second Embodiment

Patent Literature 1 discloses that upon outputting acoustic information and internal information having a ladder diagram format of a programmable controller resulting from simulation, the acoustic information and the internal information are approximately synchronized with each other. That is, an analyst listens to an acoustic signal reproduced for trouble analysis to detect whether a trouble has occurred. This method presents a problem in that an analyst who is unskilled in such analysis may be unaware of a sound associated with occurrence of a trouble. Thus, a second embodiment has been made in view of the foregoing, and it is an object to provide a malfunction analysis support apparatus that can support detection of occurrence of a malfunction that has occurred in a manufacturing facility using acoustic data regardless of the skill level of the analyst.

The first embodiment has been described in terms of the malfunction analysis support apparatus 30, which displays, in time synchronization, at least one of the program operation display data, the waveform data 231, and the video data, and the three-dimensional data that is a three-dimensional representation of action reproduction simulation data, which is a result of reproduction of an action on the virtual control object based on the log data. Description of the second embodiment will be directed to a malfunction analysis support apparatus that displays, in time synchronization, at least one of the program operation display data, the waveform data 231, and the video data, and acoustic analysis data obtained by analysis of acoustic data that is a record of a sound emitted by the control object 10.

Figure 17:
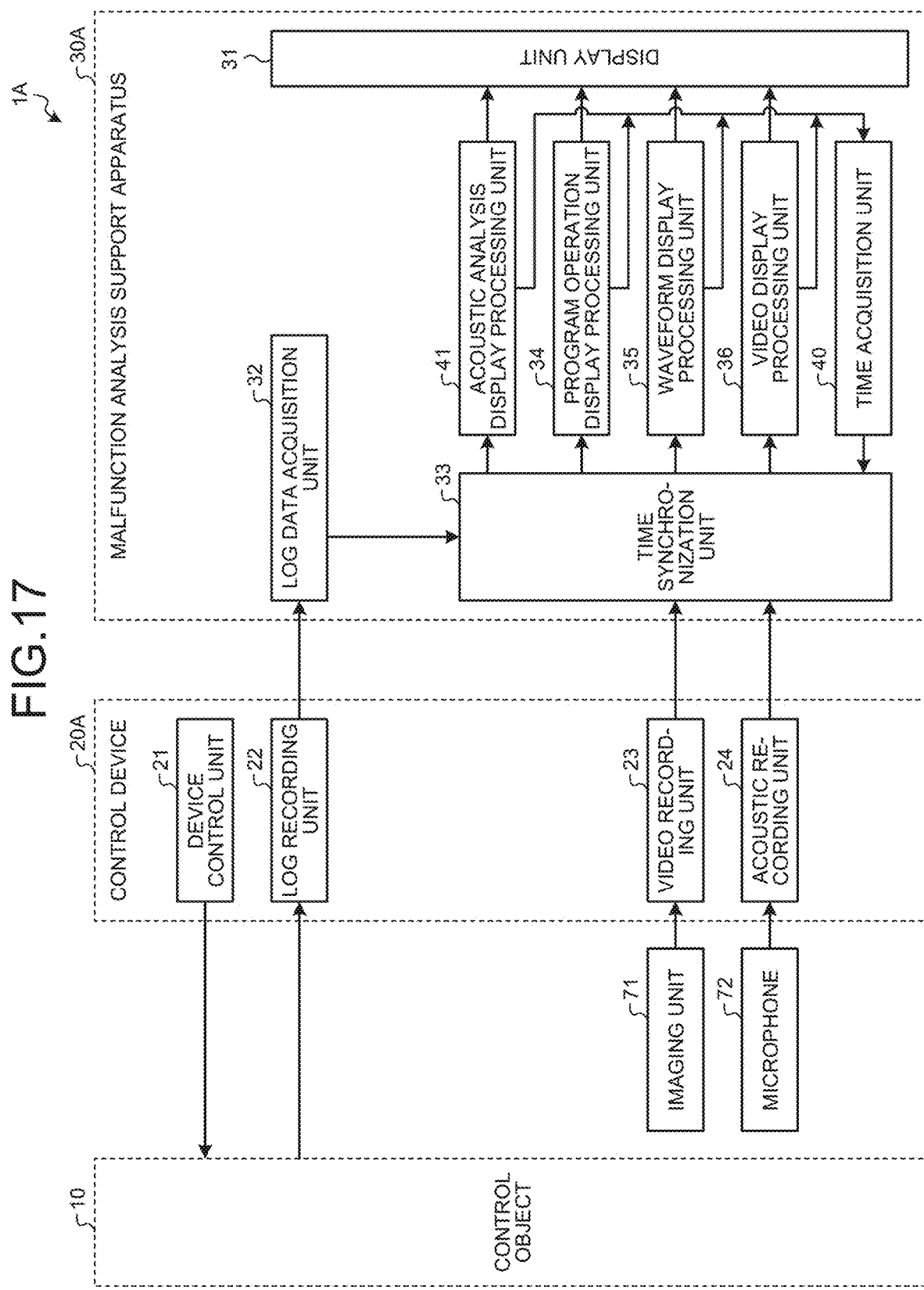
FIG. 17 is a block diagram illustrating an example of configuration of a malfunction analysis support system according to a second embodiment.

FIG. 17 is a block diagram illustrating an example of configuration of a malfunction analysis support system according to the second embodiment. Note that elements identical to the elements of the first embodiment are designated by like reference characters, and description thereof will be omitted. A malfunction analysis support system 1A according to the second embodiment includes the control object 10, a control device 20A, and a malfunction analysis support apparatus 30A.

The control device 20A further includes an acoustic recording unit 24 in addition to the components of the first embodiment. The acoustic recording unit 24 records acoustic data, which is data of a sound emitted by the control object 10 and recorded by a microphone 72. The acoustic data includes time information about the time of recording.

The malfunction analysis support apparatus 30A does not include the action reproduction unit 37, the display setting information storage unit 38, or the three-dimensional data display processing unit 39 of the first embodiment, but further includes an acoustic analysis display processing unit 41. The acoustic analysis display processing unit 41 obtains acoustic data that is a record of a sound emitted by the control object 10, and displays an analysis result of analyzing the acoustic data on the display unit 31. Specifically, the acoustic analysis display processing unit 41 performs time-frequency analysis on the acoustic data obtained from the acoustic recording unit 24 of the control device 20A, generates an acoustic analysis display screen including an acoustic analysis result such as a three-dimensional graph, and displays the acoustic analysis display screen on the display unit 31. An example of the time-frequency analysis is wavelet transform. Note that, although not illustrated, the acoustic analysis display screen includes, similarly to the three-dimensional data display screen 280, an acoustic analysis result display area for displaying the acoustic analysis result, and a time control area. The time control area has functionality to specify a time for the acoustic analysis result to be displayed in the acoustic analysis result display area. The technology to perform a time-frequency analysis on acoustic data and to display the result thereof by the acoustic analysis display processing unit 41 can be implemented using a known method.

The time synchronization unit 33 synchronizes time among the log data from the log data acquisition unit 32, the video data from the video recording unit 23, and the acoustic data from the acoustic recording unit 24, and provides the log data, the video data, and the acoustic data to the program operation display processing unit 34, to the waveform display processing unit 35, to the video display processing unit 36, and to the acoustic analysis display processing unit 41. This causes, similarly to the first embodiment, the program operation display screen 200, the waveform display screen 230, and the video display screen 250, and the acoustic analysis display screen to be synchronized with one another.

Note that similarly to the case of the first embodiment, it is sufficient that the malfunction analysis support apparatus 30A include at least one of the program operation display processing unit 34, the waveform display processing unit 35, and the video display processing unit 36. In addition, the malfunction analysis support method according to the second embodiment is similar to the malfunction analysis support method described in the first embodiment, and description thereof will therefore be omitted.

Figure 18:
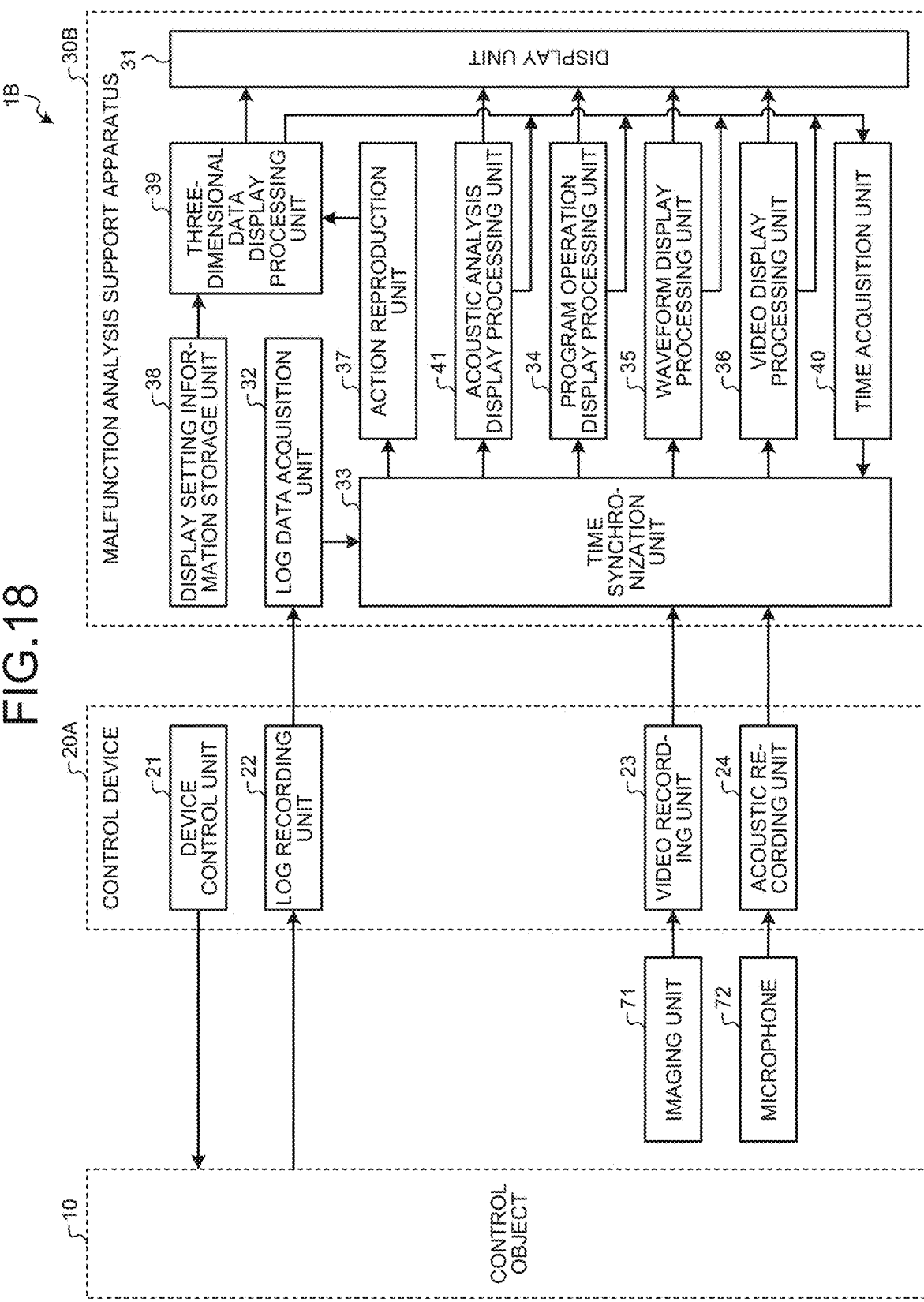
FIG. 18 is a block diagram illustrating another example of configuration of the malfunction analysis support system according to the second embodiment.

FIG. 18 is a block diagram illustrating another example of configuration of the malfunction analysis support system according to the second embodiment. Note that elements identical to the elements of the first embodiment and of FIG. 17 are designated by like reference characters, and description thereof will be omitted. A malfunction analysis support system 1B illustrated in FIG. 18 includes the control object 10, the control device 20A, and a malfunction analysis support apparatus 30B.

The malfunction analysis support apparatus 30B further includes the acoustic analysis display processing unit 41 described with reference to FIG. 17 in addition to the components of the malfunction analysis support apparatus 30 of the first embodiment. Such configuration causes the program operation display screen 200, the waveform display screen 230, and the video display screen 250, the three-dimensional data display screen 280, and the acoustic analysis display screen to be synchronized with one another.

Note that similarly to the case of the first embodiment, it is sufficient that the malfunction analysis support apparatus 30B include at least one of the program operation display processing unit 34, the waveform display processing unit 35, and the video display processing unit 36.

In the second embodiment, a sound emitted by the control object 10 is recorded by the acoustic recording unit 24 of the control device 20A as acoustic data. Then, the acoustic analysis display processing unit 41 of the malfunction analysis support apparatus 30A or 30B displays an acoustic analysis display screen including the analysis result of analyzing the acoustic data. In addition, the acoustic data input to the acoustic analysis display processing unit 41, the log data input to the program operation display processing unit 34 and to the waveform display processing unit 35, and the video data input to the video display processing unit 36 are synchronized with one another by the time synchronization unit 33. Thus, since the acoustic data is visualized, it is possible to support detection of occurrence of a malfunction that has occurred in a manufacturing facility using acoustic data regardless of the skill level of the analyst. That is, the acoustic analysis display screen synchronized with at least one of the program operation display screen 200, the waveform display screen 230, and the video display screen 250, which are results of actual action of the control object 10, is displayed with at least one screen of the program operation display screen 200, the waveform display screen 230, and the video display screen 250. Then, providing these screens to the user can support analysis by the user of a malfunction state of the control object 10.

For example, a user who is unskilled in malfunction analysis may be unaware of a sound of malfunction only by listening to reproduced acoustic data for making a determination. In contrast, by viewing the acoustic analysis display screen including an analysis result of analyzing acoustic data using a technique such as time-frequency analysis, the user can easily extract an anomalous point in the analysis result. That is, even a user unskilled in malfunction analysis can extract a portion that seems to represent a malfunction, from the acoustic analysis display screen.

Third Embodiment

The first embodiment has been described in which when an action is to be reproduced on the virtual control object after a specified time is obtained by the time acquisition unit 40, the action reproduction unit 37 causes the virtual control object to reproduce an action based on the log data. However, use of only the log data fails to cause the virtual control object to reproduce the same action as that of the actual control object 10. This is because no initial state has been defined with respect to the virtual control object. For example, the first embodiment has been described, as illustrated in FIG. 13, with respect to an example in which the workpiece 100 does not fit into the recessed portion 111 of the receiving tray 110, which has led to a malfunction. In this case, to cause the virtual control object to reproduce an action by the action reproduction unit 37, a definition needs to be made for the virtual control object with respect to the actual position of the workpiece 100 relative to the receiving tray 110 at the second position 122 at the time "11:11:17" in FIG. 14. Without definition, the action reproduction unit 37 will reproduce an action on the virtual control object as if the workpiece 100 had fitted normally into the recessed portion 111 of the receiving tray 110. That is, the three-dimensional data display screen 280 will display a normal condition in which the workpiece 100 has fitted into the recessed portion 111 of the receiving tray 110 at the time "11:11:17". This may prevent the user who sees this display from finding out the cause for which the sensor 142 has not been turned on. Accordingly, description of a third embodiment will be directed to a malfunction analysis support system capable of reproducing an action on the virtual control object such that the action will be similar to the action of the actual control object 10.

Figure 19:
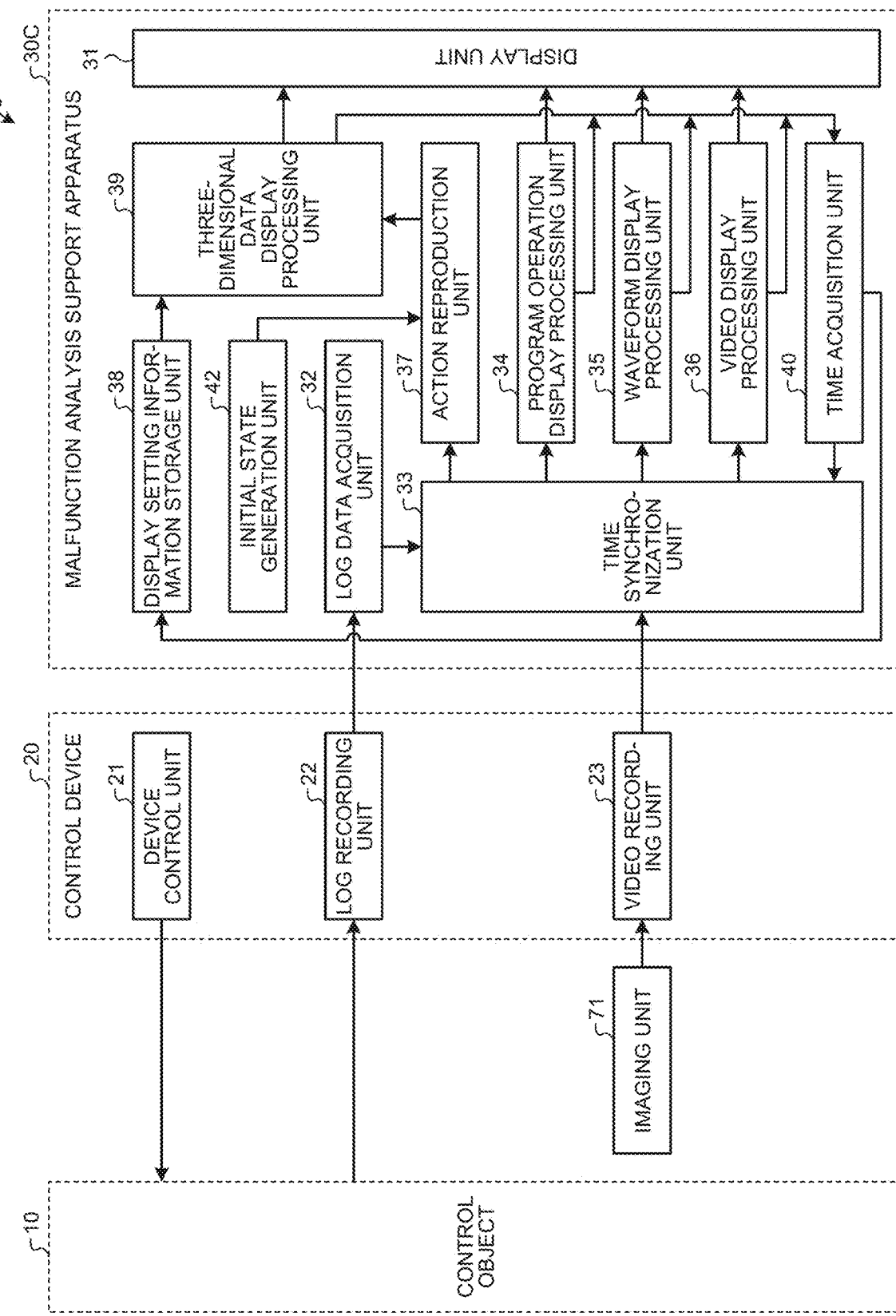
FIG. 19 is a block diagram illustrating an example of configuration of a malfunction analysis support system according to a third embodiment.

FIG. 19 is a block diagram illustrating an example of configuration of a malfunction analysis support system according to the third embodiment. A malfunction analysis support system 1C according to the third embodiment includes the control object 10, the control device 20, and a malfunction analysis support apparatus 30C. Note that elements identical to the elements of the first embodiment are designated by like reference characters, and description thereof will be omitted. In addition, the video display processing unit 36 is an essential element in the third embodiment.

The malfunction analysis support apparatus 30C further includes an initial state generation unit 42 in addition to the components of the first embodiment. The initial state generation unit 42 generates initial state information, which represents the state of a member included in the control object 10 based on an image of video data at a specified time. Specifically, the initial state generation unit 42 obtains the specified time from the time acquisition unit 40, refers to the video data at the specified time, and generates initial state information included in the control object 10. In one example, the initial state generation unit 42 obtains a screenshot image at the specified time from the video data, and obtains, from the screenshot image, the positions and arrangement of the operational part of the control object 10 and of the workpiece 100 to generate the initial state information. The initial state generation unit 42 provides the initial state information to the action reproduction unit 37. By way of example, the initial state generation unit 42 identifies and reproduces the position of the workpiece 100 at the specified time, and identifies and reproduces the state of the robot hand mechanism 130 at the specified time. A technology to obtain the arrangement of objects included in an image from the image can be implemented using a known method. Note that although the above example assumes that the initial state information is generated using a screenshot image of the video data at the specified time, another data may be used that enables acquisition of the state of a member included in the control object 10 at the specified time.

The action reproduction unit 37 sets the state of a member of the virtual control object at the specified time based on the initial state information, and generates action reproduction simulation data, which is a result of reproduction, based on the log data, of an action on the virtual control object for which the initial state information has been set. Specifically, the action reproduction unit 37 sets, based on the initial state information, the positions and arrangement of the operational part of the virtual control object and of a virtual workpiece 100 upon reproduction of an action at the specified time on the virtual control object. The action reproduction unit 37 then reproduces an action on the virtual control object based on the log data and on the initial state information that has been set.

Figure 20:
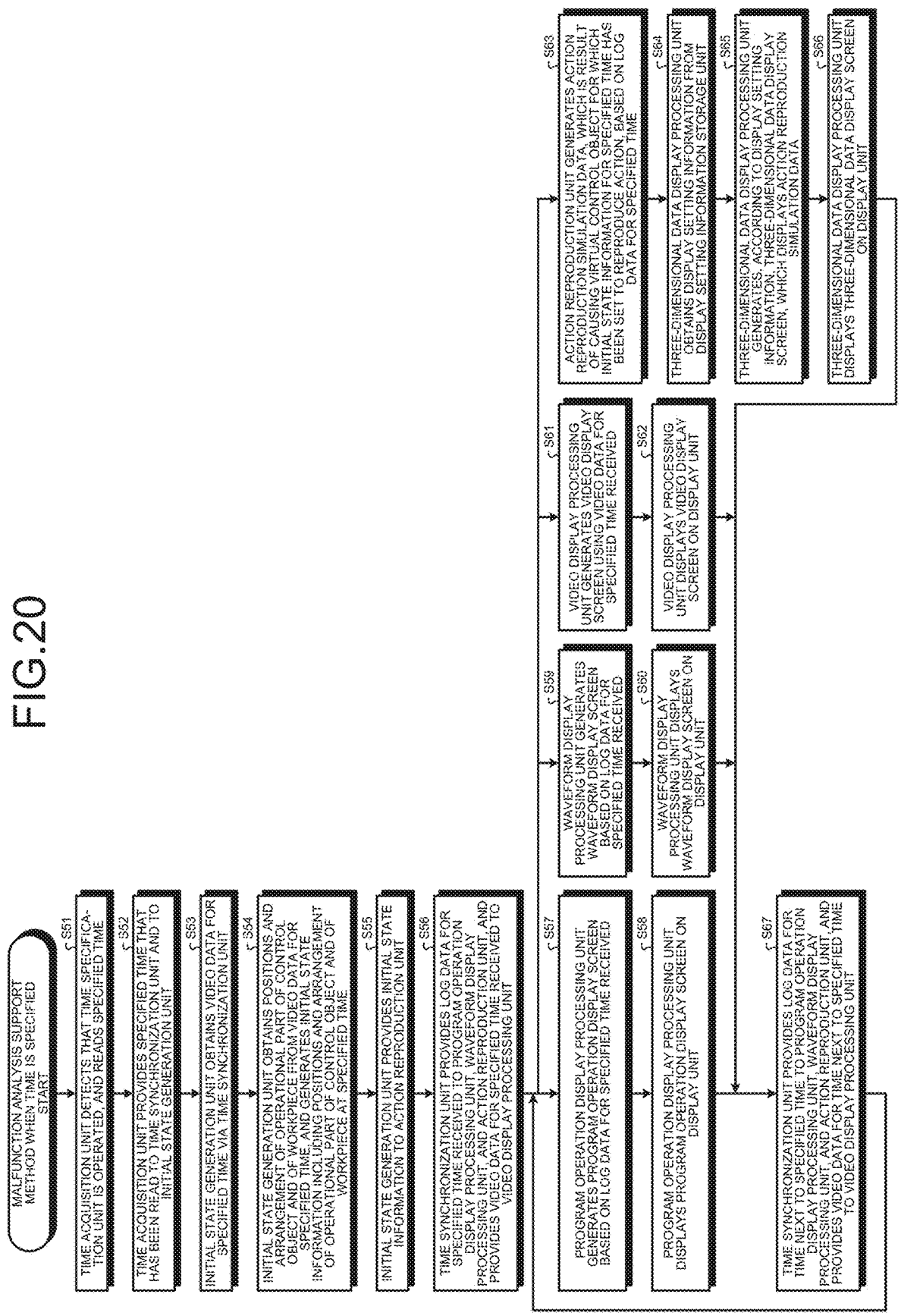
FIG. 20 is a flowchart illustrating an example of procedure of a malfunction analysis support method when a specified time is specified, according to the third embodiment.

A method for displaying the three-dimensional data when a specified time is specified in the malfunction analysis support method according to the third embodiment will next be described. FIG. 20 is a flowchart illustrating an example of procedure of a malfunction analysis support method when a specified time is specified, according to the third embodiment. It is assumed here that the display unit 31 has been displaying the program operation display screen 200, the waveform display screen 230, the video display screen 250, and the three-dimensional data display screen 280 according to FIG. 7 for the first embodiment.

First, the user operates the time specification unit of one of the program operation display screen 200, the waveform display screen 230, the video display screen 250, and the three-dimensional data display screen 280. The time specification unit is the slider 227, 272, or 302 or the cursor 243. The time acquisition unit 40 detects that the time specification unit is operated, reads the specified time (step S51), and provides the specified time that has been read, to the time synchronization unit 33 and to the initial state generation unit 42 (step S52).

The initial state generation unit 42 obtains video data for the specified time via the time synchronization unit 33 (step S53), obtains the positions and arrangement of the operational part of the control object 10 and of the workpiece 100, from the video data for the specified time, and generates initial state information including the positions and arrangement of the operational part of the control object 10 and of the workpiece 100 at the specified time (step S54). The initial state generation unit 42 then provides the initial state information to the action reproduction unit 37 (step S55).

The time synchronization unit 33 provides the log data for the specified time received, to the program operation display processing unit 34, to the waveform display processing unit 35, and to the action reproduction unit 37, and provides the video data for the specified time received, to the video display processing unit 36 (step S56).

Then, the program operation display processing unit 34, the waveform display processing unit 35, and the video display processing unit 36 perform operations similar to the operations at steps S34 to S39 of FIG. 8 (steps S57 to S62). In addition, the action reproduction unit 37 generates action reproduction simulation data, which is a result of causing the virtual control object for which the initial state information for the specified time has been set to reproduce an action, based on the log data for the specified time (step S63). Then, operations similar to steps S41 to S43 of FIG. 8 are performed (steps S64 to S66).

After steps S58, S60, S62, and S66, an operation similar to step S44 of FIG. 8 is performed (step S67), and the process returns to steps S57, S59, S61, and S63. That is, the program operation display screen 200, the waveform display screen 230, the video display screen 250, and the three-dimensional data display screen 280 for the time next to the specified time are displayed on the display unit 31 in a similar manner.

In the third embodiment, the initial state generation unit 42 obtains the positions and arrangement of the operational part of the control object 10 and of the workpiece 100 at the specified time, and generates initial state information including these positions and arrangement of the operational part and of the workpiece 100. The action reproduction unit 37 reproduces an action on the virtual control object based on the initial state information and on the log data for the specified time. This causes the positions and arrangement of the operational part in the virtual control object and of the workpiece 100 at the specified time to be similar to the positions and arrangement of the workpiece 100 and the operational part of the actual control object 10, and the reproduction of an action is performed from this state based on the log data. That is, this enables the three-dimensional data display processing unit 39 to reproduce an action identical to the action of the actual control object 10. Meanwhile, changing the specified time using the time specification unit causes the initial state to vary depending on the specified time. By changing the specified time by the user on a trial and error basis, the state of occurrence of a malfunction can be displayed in the program operation display screen 200 and in the waveform display screen 230. In this case, the three-dimensional data display screen 280 displays the occurrence of the malfunction, and can thus provide the user with a cause of the malfunction.

Note that when the video data that records an action of the actual control object 10, and the three-dimensional data, which is a three-dimensional representation of the action reproduction simulation data, which represents a reproduction of an action on the virtual control object generated by the action reproduction unit 37, are to be displayed in synchronization with each other, one known method is to reset both the video data and three-dimensional data to, for example, return the time of the video data back to the initial time. With this method, to reproduce the log data by the action reproduction unit 37 from a specified time that is not the initial time, the video data needs to be reproduced from the initial time to the specified time, which is inefficient. That is, the user needs to wait for the time required for simulation from the initial time of the video data to the specified time to view the three-dimensional data for the specified time. In addition, there may be a mismatch in action between the three-dimensional data representing an action reproduced on the virtual control object as described above and the video data representing an action of the actual control object 10. This is because the state at the specified time may differ between the three-dimensional data and the video data even if the state in the three-dimensional data is made the same as the state in the video data at the time of start of the simulation.

In contrast, in the third embodiment, the initial state of the virtual control object at the start time of the action reproduction, i.e., at the specified time, is reproduced faithfully from an image of the video data at the specified time, thereby enabling the action reproduction unit 37 to faithfully reproduce an action state in the past on the virtual control object using the log data. In addition, the action reproduced on the virtual control object in such manner is similar to the action of the actual control object 10 displayed in the video display processing unit 36. Moreover, the reproduction of the action on the virtual control object is started from the specified time, thereby eliminating the need for simulation from the initial time of the video data to the specified time, and thus enabling the action of the virtual control object at the specified time to be provided without keeping the user waiting.

In addition, the foregoing description has been provided assuming that the initial state generation unit 42 is added to the configuration of the first embodiment, but the initial state generation unit 42 may be added to the configuration of FIG. 18 in the second embodiment. Such configuration can also provide an advantage similar to the foregoing advantage.

Fourth Embodiment

The configuration of the first embodiment does not allow prediction of when a malfunction may occur. It is therefore desirable that the log recording unit 22 and the video recording unit 23 of the control devices 20 and 20A can record log data and video data for as long a time as possible. This requires the log recording unit 22 and the video recording unit 23 to have a high recording capacity, which presents a problem of increased manufacturing cost for the malfunction analysis support systems 1, 1A, 1B, and 1C. Description of a fourth embodiment will be directed to a malfunction analysis support system capable of reducing the recording capacity of each of the log recording unit 22 and the video recording unit 23.

Figure 21:
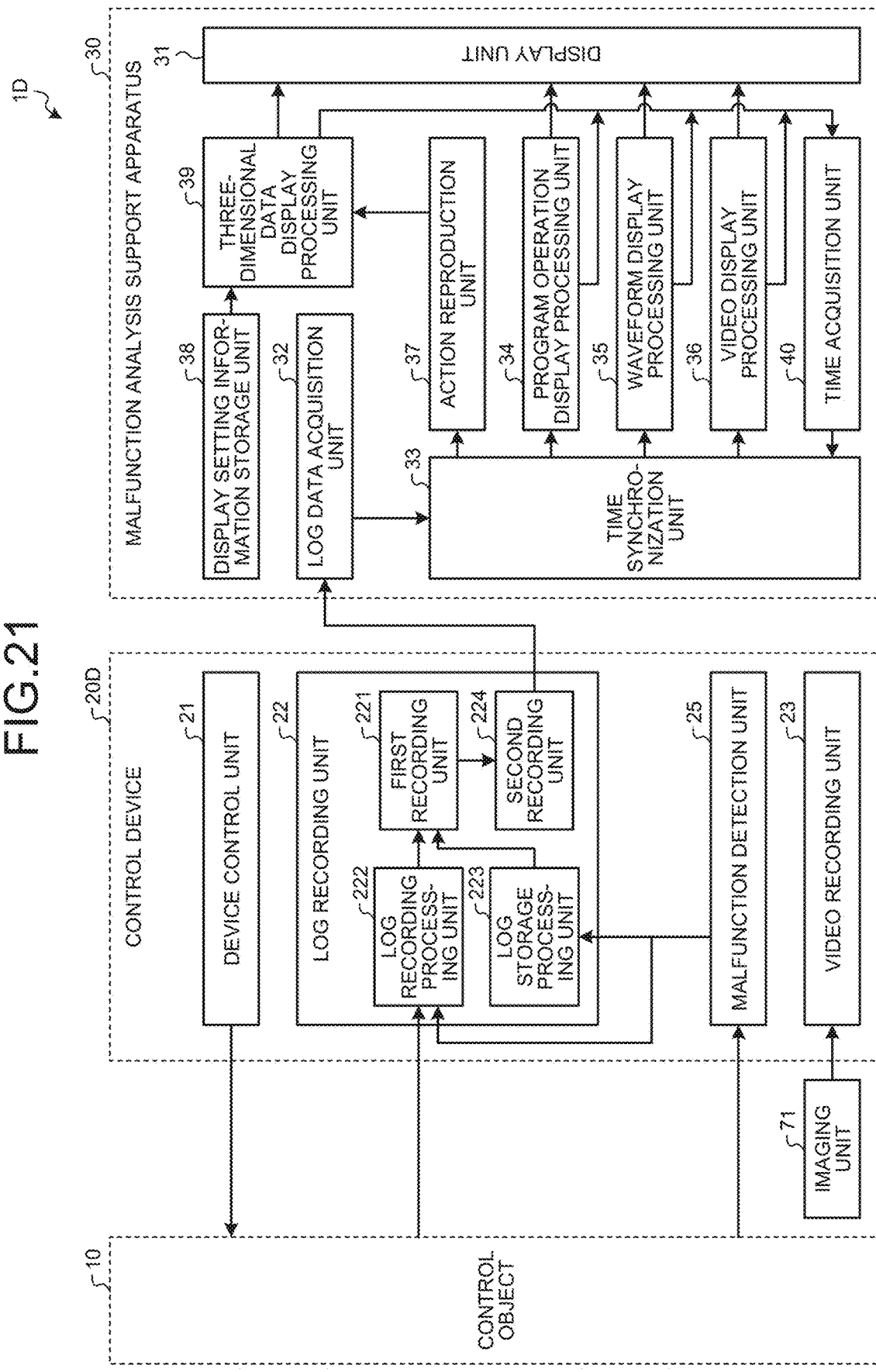
FIG. 21 is a block diagram illustrating an example of configuration of a malfunction analysis support system according to a fourth embodiment.

FIG. 21 is a block diagram illustrating an example of configuration of a malfunction analysis support system according to the fourth embodiment. A malfunction analysis support system 1D according to the fourth embodiment includes the control object 10, a control device 20D, and the malfunction analysis support apparatus 30. Note that elements identical to the elements of the first embodiment are designated by like reference characters, and description thereof will be omitted.

The control device 20D further includes a malfunction detection unit 25 in addition to the components of the first embodiment. The malfunction detection unit 25 detects a malfunction that occurs when the device control unit 21 executes the control program. Specifically, the malfunction detection unit 25 continuously observes the state of the control object 10 to detect occurrence of a malfunction in the control object 10. Upon detection of occurrence of a malfunction, the malfunction detection unit 25 informs the log recording unit 22 of detection information, which is a signal indicating that a malfunction has occurred. The detection information includes, in one example, the time of detection of the occurrence of a malfunction. One example of the malfunction detection unit 25 is an annunciator that is turned on upon occurrence of a conceivable malfunction defined in the control program. One example of the malfunction is a stop of the operational part, such as the robot hand mechanism 130, during the course of operation. In this case, a malfunction is detected by turning on of the annunciator when the shaft angle of the robot hand mechanism 130 in the facility of FIG. 2 remains the same for a predetermined time period, e.g., 3 seconds, by way of example.

In addition, in the fourth embodiment, the log recording unit 22 of the control device 20D is configured differently from that in the first embodiment. The log recording unit 22 includes a first recording unit 221, a log recording processing unit 222, a log storage processing unit 223, and a second recording unit 224.

The first recording unit 221 has a capacity that can store log data for a predetermined first time period. The first time period can be, by way of example, 10 minutes.

The log recording processing unit 222 uses the first recording unit 221 as a ring buffer in one example, and records the log data in the first recording unit 221. Specifically, the log recording processing unit 222 records, in a time sequence, input-output data including input data and output data sent from and received by the device control unit 21 to and from the control object 10, and state data representing the state of the operational part of the control object 10, as log data in the first recording unit 221. For example, the log recording processing unit 222 records the log data in the first recording unit 221, causing the first recording unit 221 to reach its capacity in 10 minutes from the start of recording. In this case, the log recording processing unit 222 records the log data after lapse of 10 minutes in the first recording unit 221 by sequentially overwriting the log data from the log data for 0 minutes. Consequently, previous log data is overwritten, and the log data before the lapse of 10 minutes no longer exists. Thereafter, each time the recordable capacity of the first recording unit 221 becomes full of log data, a similar overwriting process is performed.

The log storage processing unit 223 stores, in the second recording unit 224, a portion of the log data in the first recording unit 221, the portion having a length of a second time period shorter than the first time period, including the time of detection of a malfunction by the malfunction detection unit 25. In one example, the second time period is set to less than the first time period and to include a predetermined time period before and after the time of occurrence of a malfunction. For example, the second time period can be 4 minutes including 2 minutes before and 2 minutes after the time of occurrence of a malfunction. In this case, upon reception of notification of detection of occurrence of a malfunction from the malfunction detection unit 25, the log storage processing unit 223 performs a process of obtaining, from the first recording unit 221, the portion of the log data for 4 minutes including 2 minutes each before and after the time of occurrence of a malfunction when two minutes has elapsed since the time of the occurrence of a malfunction, and of storing that portion of the log data in the second recording unit 224. That is, the log data for the second time period including the time of detection of the occurrence of a malfunction is stored in the second recording unit 224 as a file.

The second recording unit 224 stores a file of the log data for the second time period including the time of detection of the occurrence of a malfunction. The second recording unit 224 is a non-volatile recording unit. It is sufficient that the second recording unit 224 have a capacity that can store at least one file of log data.

A malfunction analysis support method for use in the malfunction analysis support system 1D of the fourth embodiment is similar to that described in the first embodiment, and description thereof will therefore be omitted. Note that the log data acquisition unit 32 of the malfunction analysis support apparatus 30 reads the log data stored in the second recording unit 224 of the log recording unit 22 of the control device 20D when an instruction to check the log data or the like is input.

Figure 22:
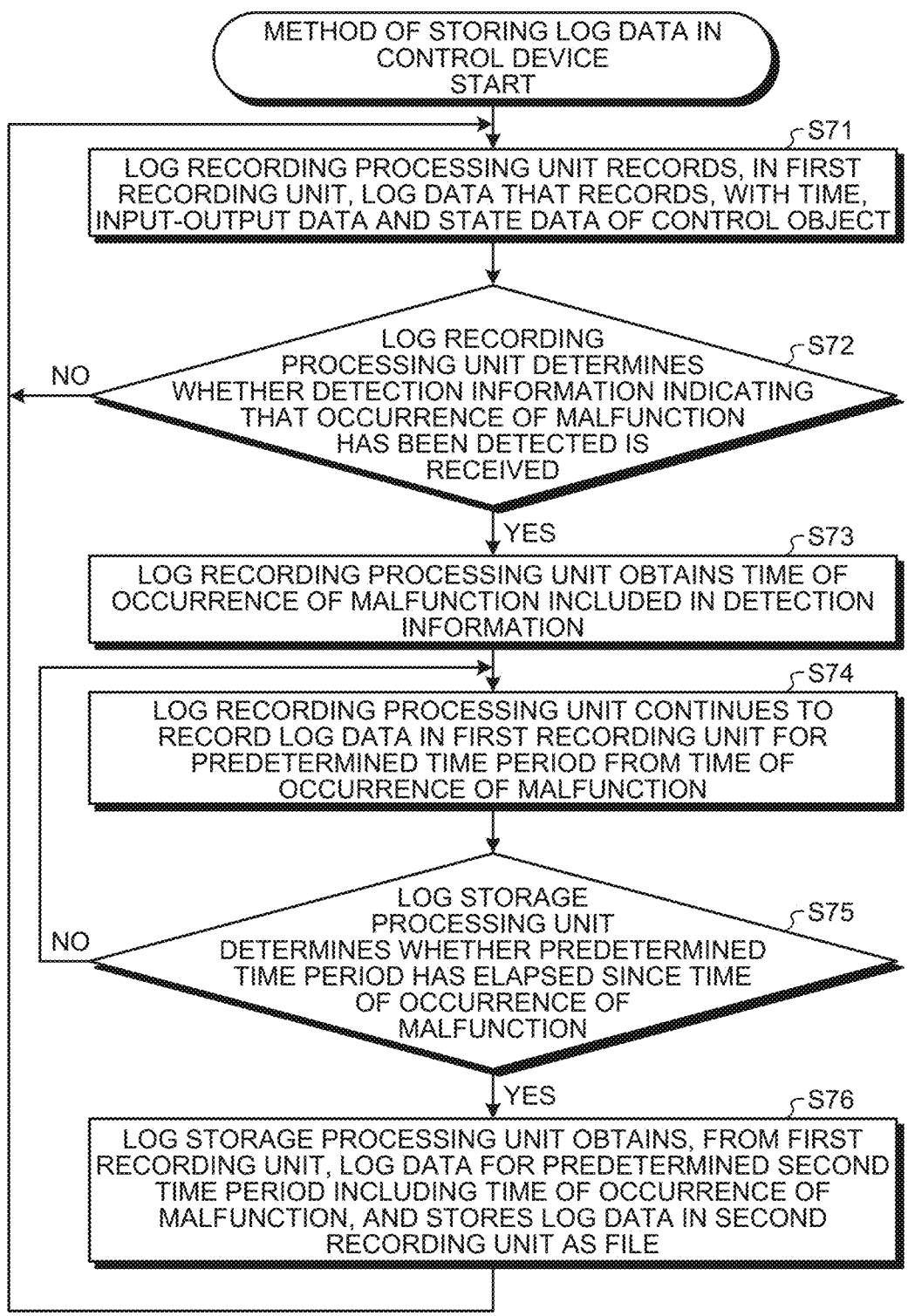
FIG. 22 is a flowchart illustrating an example of procedure of a method of storing log data in the control device of the malfunction analysis support system according to the fourth embodiment.

A method for recording log data in the log recording unit 22 will now be described. FIG. 22 is a flowchart illustrating an example of procedure of a method of storing log data in the control device of the malfunction analysis support system according to the fourth embodiment.

First, the log recording processing unit 222 of the log recording unit 22 records, in the first recording unit 221, log data that records, with time, the input-output data and the state data of the control object 10 (step S71). Then, the log recording processing unit 222 determines whether detection information indicating detection of occurrence of a malfunction is received (step S72). If no detection information is received (if No at step S72), the process returns to step S71, and the log data is stored in the first recording unit 221.

If the detection information is received (if Yes at step S72), the log recording processing unit 222 obtains the time of the occurrence of a malfunction included in the detection information (step S73), and continues to record the log data in the first recording unit 221 for the predetermined time period from the time of the occurrence of a malfunction (step S74).

Then, the log storage processing unit 223 determines whether the predetermined time period has elapsed since the time of the occurrence of a malfunction (step S75). If the predetermined time period has not yet elapsed since the time of the occurrence of a malfunction (if No at step S75), the process returns to step S74. Alternatively, if the predetermined time period has elapsed since the time of the occurrence of a malfunction (if Yes at step S75), the log storage processing unit 223 obtains, from the first recording unit 221, the portion of the log data for the predetermined second time period including the time of the occurrence of a malfunction, and stores that portion of the log data in the second recording unit 224 as a file (step S76). The process then returns to step S71.

Note that the video recording unit 23 or the acoustic recording unit 24 according to the second embodiment may also be configured similarly to the log recording unit 22 described in connection with the fourth embodiment.

In the fourth embodiment, the log recording unit 22 includes the first recording unit 221 having a capacity that can record log data for the first time period, and the second recording unit 224 that can store log data for the second time period shorter than the first time period, as a file. The log recording unit 22 includes the log storage processing unit 223, which when the malfunction detection unit 25 detects occurrence of a malfunction, stores the portion of the log data for a predetermined time period including the time of the occurrence of a malfunction, from the first recording unit 221 in the second recording unit 224. Such configuration enables the recording capacity of the log recording unit 22 to be less than that of the first through third embodiments. In addition, the user needs only to obtain log data for a time period including the time of the occurrence of a malfunction from the second recording unit 224, and then perform malfunction analysis, thereby enabling a reduction in the labor to find the portion of the occurrence of the malfunction from an enormous amount of data.

Fifth Embodiment

The description of the first through fourth embodiments has assumed that a malfunction is caused by the control object 10. However, in a case in which the control object 10 is the manufacturing facility, operation of the manufacturing facility may include a process involving a person such as a worker, and/or a process involving an unmanned transport machine such as an unmanned transport vehicle, such as an automatic guided vehicle (AGV) or a forklift, or an unmanned transport robot. Accordingly, contact of a person or an unmanned transport machine with the manufacturing facility may also cause a malfunction in the control object 10. Thus, description of a fifth embodiment will be directed to a malfunction analysis support system capable of analyzing the cause of a malfunction including a person or an unmanned transport machine.

Figure 23:
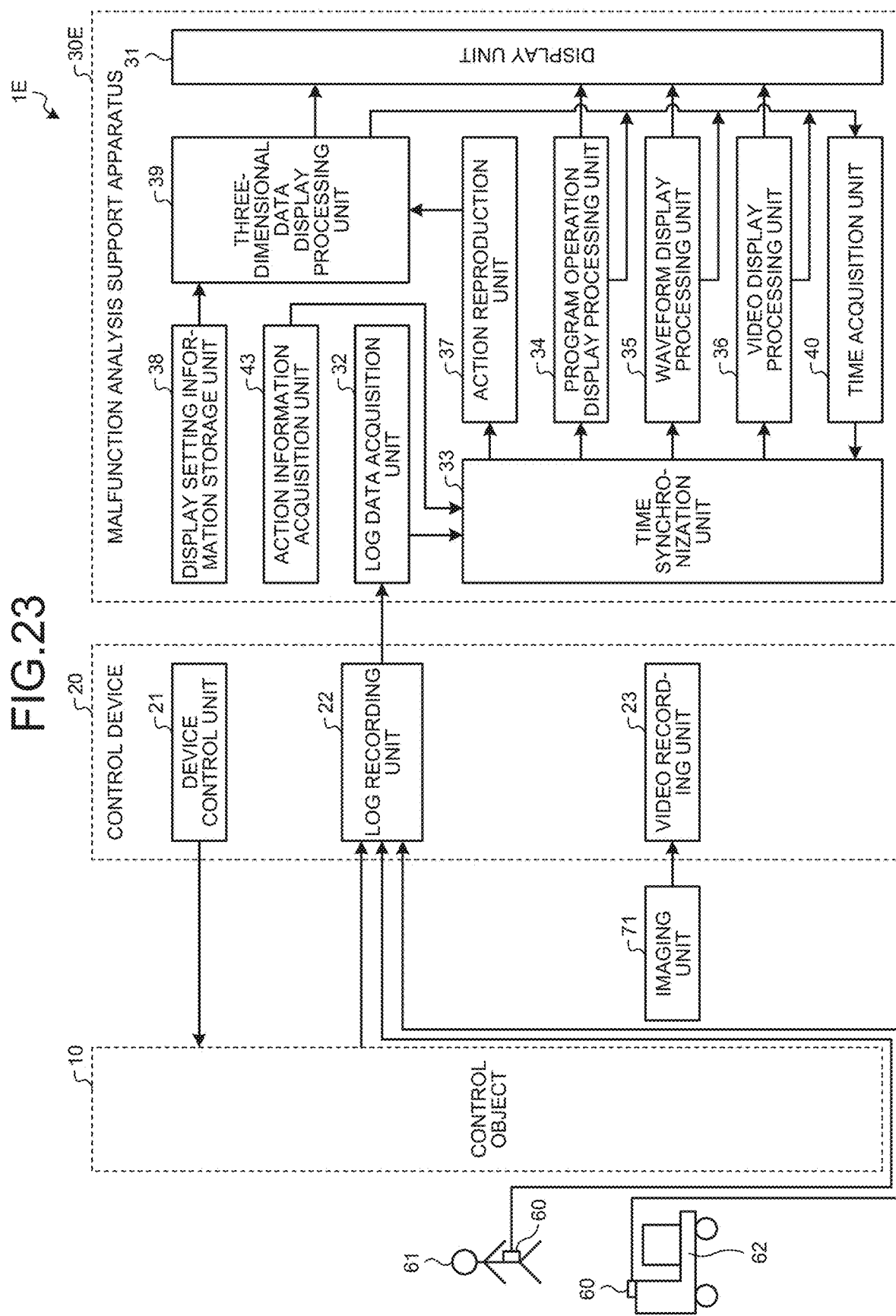
FIG. 23 is a block diagram illustrating an example of configuration of a malfunction analysis support system according to a fifth embodiment.

FIG. 23 is a block diagram illustrating an example of configuration of a malfunction analysis support system according to the fifth embodiment. A malfunction analysis support system 1E according to the fifth embodiment includes the control object 10, the control device 20, a malfunction analysis support apparatus 30E, and action information recording devices 60 respectively carried by a person 61 and by an unmanned transport machine 62 present in the same area as the control object 10. It is sufficient that one of the person 61 and the unmanned transport machine 62 be present in the same area as the control object 10, but the following description will be provided using an example in which both the person 61 and the unmanned transport machine 62 are present in the same area as the control object 10. Note that elements identical to the elements of the first embodiment are designated by like reference characters, and description thereof will be omitted.

The action information recording devices 60 are devices that each record action information that has recorded, with time, an action of the corresponding one of the person 61 and the unmanned transport machine 62 carrying that action information recording device 60. In one example, the action information is information that has recorded an action of the corresponding one of the person 61 and the unmanned transport machine 62 at a predetermined time interval. The action information includes at least one of the position and the state of the corresponding one of the person 61 and the unmanned transport machine 62. The following example assumes that the action information is information that has recorded the position with time. The position can be obtained using a known technology. Examples of such technology include a technology that measures the position by receiving a radio wave from multiple global positioning system (GPS) satellites and a technology that estimates the movement track on a map by pedestrian dead reckoning using an angular velocity sensor and an acceleration sensor. In the latter case, a signal sending device that sends a beacon signal that allows the position to be known is installed at, for example, an entrance of the area where the control object 10 is provided, and estimation of the movement track relative to the position of the entrance enables estimation of the positions of the person 61 and of the unmanned transport machine 62 in the area where the control object 10 is provided.

The malfunction analysis support apparatus 30E further includes an action information acquisition unit 43 in addition to the components of the first embodiment. The action information acquisition unit 43 obtains the action information from the action information recording devices 60 of the person 61 and of the unmanned transport machine 62 when the user provides an instruction to obtain the log data. As described above, the action information as used herein is information that has recorded, in a time sequence, the positions of the person 61 and of the unmanned transport machine 62.

In the fifth embodiment, the action reproduction unit 37 of the malfunction analysis support apparatus 30E generates action reproduction simulation data that is not only a reproduction of an action on the virtual control object based on the log data, but also a reproduction, based on the action information, of the tracks on a virtual person corresponding to the person 61 and on a virtual unmanned transport machine corresponding to the unmanned transport machine 62. The action reproduction simulation data is a result of simulation that maintains the relationship between the position of the virtual control object and the positions of the virtual person and of the virtual unmanned transport machine the same as the relationship between the position of the actual control object 10 and the positions of the person 61 and of the unmanned transport machine 62.

The three-dimensional data display processing unit 39 displays, on the display unit 31, the three-dimensional data that is a reproduction not only of an action on the virtual control object, but also of actions on the virtual person and on the virtual unmanned transport machine. In one example, when the virtual person or the virtual unmanned transport machine passes by the virtual control object, the virtual person or the virtual unmanned transport machine is three-dimensionally displayed together with the virtual control object.

A malfunction analysis support method for use in the malfunction analysis support system 1E of the fifth embodiment is similar to that described in the first embodiment except that, as described above, the action reproduction unit 37 reproduces an action on the virtual control object based on the log data and reproduces actions on the virtual person and on the virtual unmanned transport machine based on the action information, and description thereof will therefore be omitted. In addition, the foregoing description has been directed to a case of application of the fifth embodiment to the configuration of the first embodiment, but the fifth embodiment may also be applied to the configurations of the second through fourth embodiments.

In the fifth embodiment, the action information recording device 60 is installed on the person 61 or the unmanned transport machine 62 present in the same area as the control object 10, and the action information recording device 60 records action information of the person 61 or the unmanned transport machine 62. The action information acquisition unit 43 of the malfunction analysis support apparatus 30E obtains the action information from the action information recording device 60 when malfunction analysis is to be performed. The action reproduction unit 37 generates the action reproduction simulation data that is not only a reproduction of an action on the virtual control object based on the log data, but also a reproduction of an action of the person 61 or of the unmanned transport machine 62 based on the action information. The three-dimensional data display processing unit 39 three-dimensionally displays the action reproduction simulation data. This enables verification of whether a malfunction has been caused by contact of the person 61 or by contact of the unmanned transport machine 62 with the control object 10 by checking the three-dimensional data display screen 280. That is, the malfunction analysis support apparatus 30E can also cover a case in which a malfunction of the control object 10 has been caused externally.

Sixth Embodiment

Environment such as the temperature and the humidity surrounding the control object 10 is not taken into consideration in the first through fifth embodiments. Description of a sixth embodiment will be directed to a malfunction analysis support system that reproduces an action of the control object 10 while taking into consideration the environment surrounding the control object 10.

The malfunction analysis support system 1 according to the sixth embodiment is configured similarly to the malfunction analysis support system 1 illustrated in FIG. 1 in the first embodiment. Note that the log recording unit 22 also records, as the log data, environmental data obtained from an environmental data measurement unit that measures the environment of the area where the control object 10 is disposed. Examples of the environment of the area where the control object 10 is disposed include the temperature and the humidity. In this case, the environmental data measurement unit is a temperature measurement unit and a humidity measurement unit. The environmental data measurement unit may measure environmental data representing the area where the control object 10 is disposed or may measure environmental data of any portion of the control object 10. In the latter case, the environmental data measurement unit is provided on the portion to be measured.

In addition, the action reproduction unit 37 of the malfunction analysis support apparatus 30 generates the action reproduction simulation data that is not only a reproduction of an action on the virtual control object based on the log data, but is also a result of simulation of a change in the shape of the virtual control object using temperature information measured by the temperature measurement unit and using information including the materials of parts included in the control object 10. That is, the action reproduction unit 37 also simulates expansion of each member included in the control object 10, using the temperature information. This enables reproduction of the state of a member formed of a material that expands and contracts by a temperature change.

The three-dimensional data display processing unit 39 changes the state of the objects included in the three-dimensional data depending on the level of the environmental data obtained, upon displaying the action reproduction simulation data as the three-dimensional data. In one example, an example of changing the state of an object is to change the color depending on a value of the environmental data. In a case in which the environmental data is temperature, the three-dimensional data display processing unit 39 displays an object with different colors as in thermography. In this case, the three-dimensional data display processing unit 39 can display an object with different colors by storing in advance setting information that associates a value of the environmental data with a displayed color.

Note that the foregoing description has been directed to a case of measuring the temperature or the humidity as the environmental data, but the atmospheric pressure, a dust density, and/or the like may also be measured as the environmental data. Moreover, in the case of the fifth embodiment, the temperature of a worker who is the person 61 and/or the temperature and/or the like of the unmanned transport machine 62 present in the same area as the control object 10 may be added. In this case, the action information recording device 60 can measure the temperature of the person 61 or the temperature of the unmanned transport machine 62, and record this result in the action information.

A malfunction analysis support method for use in the malfunction analysis support system 1 of the sixth embodiment is similar to that described in the first embodiment, and description thereof will therefore be omitted. Note that the foregoing description has been directed to a case of application of the sixth embodiment to the configuration of the first embodiment, but the sixth embodiment may also be applied to the configurations of the second through fifth embodiments.

In the sixth embodiment, the log recording unit 22 of the control device 20 records log data including the environmental data about the area where the control object 10 is disposed. The action reproduction unit 37 of the malfunction analysis support apparatus 30 simulates the physical condition including a change in a member included in the virtual control object using the environmental data upon reproduction of an operation on the virtual control object using the log data. This enables the three-dimensional data to also represent a situation such as when the receiving tray 110 expands due to, for example, an increase in the temperature in the factory, causing the position of the workpiece 100 to deviate from the expected position. This makes it easier than before to find out the cause of a malfunction when the malfunction has arisen from the environment surrounding the control object 10. Moreover, the state of the control object 10, which is a device or an entire factory, is closer to the actual environment, thereby enabling an improvement in accuracy of malfunction analysis processing to identify the cause of a malfunction.

Note that the configurations in the foregoing first through sixth embodiments have been described in which the video data is provided from the video recording unit 23 and the acoustic data is provided from the acoustic recording unit 24, to the malfunction analysis support apparatuses 30, 30A, 30B, 30C, and 30E. However, the video data and the acoustic data may also be obtained by the log data acquisition unit 32 similarly to the case of the log data. That is, the log data acquisition unit 32 may be configured to obtain the log data from the log recording unit 22, obtain the video data from the video recording unit 23, and obtain the acoustic data from the acoustic recording unit 24. In this case, the time synchronization unit 33 is expected to synchronize data to be used in malfunction analysis among the log data, the video data, and the acoustic data.

A hardware configuration of the malfunction analysis support apparatuses 30, 30A, 30B, 30C, and 30E will now be described. The malfunction analysis support apparatuses 30, 30A, 30B, 30C, and 30E according to the first through sixth embodiments are implemented in a computer system such as a personal computer or a general-purpose computer.

Figure 24:
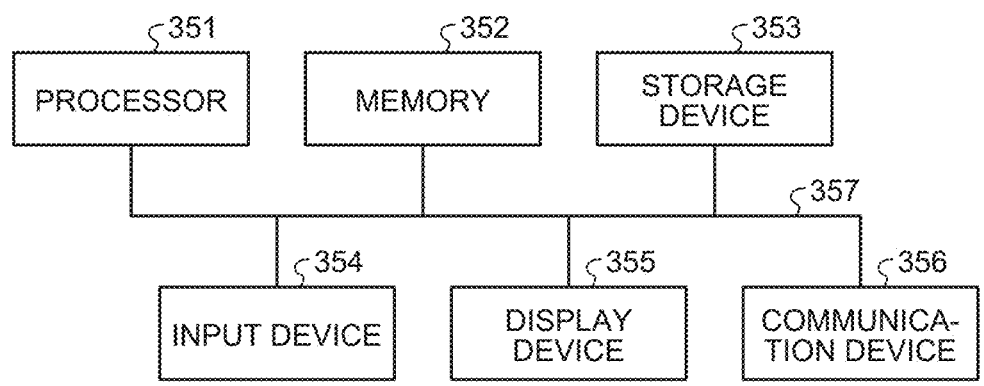
FIG. 24 is a diagram illustrating an example of hardware configuration in a case in which the functionality of each of the malfunction analysis support apparatuses according to the first through sixth embodiments is implemented in a computer system.

FIG. 24 is a diagram illustrating an example of hardware configuration in a case in which the functionality of the malfunction analysis support apparatuses according to the first through sixth embodiments is implemented in a computer system. When the functionality of the malfunction analysis support apparatuses 30, 30A, 30B, 30C, and 30E is implemented in a computer system, the functionality of the malfunction analysis support apparatuses 30, 30A, 30B, 30C, and 30E includes, as illustrated in FIG. 24, a processor 351, a memory 352, a storage device 353, an input device 354, a display device 355, and a communication device 356. The processor 351 performs computational processing. The memory 352 provides an area to be used as a work area by the processor 351. The storage device 353 stores a program for causing the computer system to operate as the malfunction analysis support apparatuses 30, 30A, 30B, 30C, and 30E. The input device 354 is an input interface with the user. The display device 355 displays information to the user. The communication device 356 has functionality to communicate with the control device 20, 20A, or 20D or other various devices. The processor 351, the memory 352, the storage device 353, the input device 354, the display device 355, and the communication device 356 are connected with one another via a data bus 357.

In this respect, the processor 351 may be a processing unit, a computing unit, a microprocessor, a microcomputer, a central processing unit (CPU), a digital signal processor (DSP), or the like. In addition, the memory 352 may be a non-volatile or volatile semiconductor memory such as a random access memory (RAM), a read-only memory (ROM), a flash memory, an erasable programmable ROM (EPROM), or an electrically erasable programmable ROM (EEPROM) (registered trademark); a magnetic disk, a flexible disk, an optical disk, a compact disc, a MiniDisc, a digital versatile disc (DVD), or the like.

The log data acquisition unit 32, the time synchronization unit 33, the program operation display processing unit 34, the waveform display processing unit 35, the video display processing unit 36, the action reproduction unit 37, the three-dimensional data display processing unit 39, the time acquisition unit 40, the acoustic analysis display processing unit 41, the initial state generation unit 42, and the action information acquisition unit 43 are implemented respectively as log data acquisition means, time synchronization means, program operation display means, waveform display means, video display means, action reproduction means, three-dimensional data display means, time acquisition means, acoustic analysis display means, initial state generation means, and action information acquisition means by, for example, execution of a program stored in the memory 352 by the processor 351 illustrated in FIG. 24. This program functions as a malfunction analysis support program. In addition, multiple processors 351 and multiple memories 352 may cooperate with one another to implement the foregoing functionality. Moreover, the functionality of the log data acquisition unit 32, the time synchronization unit 33, the program operation display processing unit 34, the waveform display processing unit 35, the video display processing unit 36, the action reproduction unit 37, the three-dimensional data display processing unit 39, the time acquisition unit 40, the acoustic analysis display processing unit 41, the initial state generation unit 42, and the action information acquisition unit 43 may be implemented partially in an electronic circuit, and the remainder thereof may be implemented by the processor 351 and the memory 352. Moreover, for example, execution of a program stored in the memory 352 by the processor 351 illustrated in FIG. 24 provides the implemented action reproduction means and the implemented three-dimensional data display means as functioning as a three-dimensional data display program.

The functionality of the malfunction analysis support method performed by the malfunction analysis support apparatuses 30, 30A, 30B, 30C, and 30E is implemented in software, firmware, or a combination of software and firmware. The software or firmware is described as a program, and is stored in the storage device 353. The processor 351 reads the software or firmware stored in the storage device 353 to the memory 352, and executes the software or firmware to implement various aspects of the functionality of the log data acquisition unit 32, the time synchronization unit 33, the program operation display processing unit 34, the waveform display processing unit 35, the video display processing unit 36, the action reproduction unit 37, the three-dimensional data display processing unit 39, the time acquisition unit 40, the acoustic analysis display processing unit 41, the initial state generation unit 42, and the action information acquisition unit 43. That is, the computer system includes the storage device 353 for storing a malfunction analysis support program that causes steps for performing the malfunction analysis support methods according to the first through sixth embodiments to be performed when the processor 351 performs various aspects of the functionality of the log data acquisition unit 32, the time synchronization unit 33, the program operation display processing unit 34, the waveform display processing unit 35, the video display processing unit 36, the action reproduction unit 37, the three-dimensional data display processing unit 39, the time acquisition unit 40, the acoustic analysis display processing unit 41, the initial state generation unit 42, and the action information acquisition unit 43.

Note that a program including the malfunction analysis support program that implements the functionality of the malfunction analysis support methods performed by the malfunction analysis support apparatuses 30, 30A, 30B, 30C, and 30E, and the three-dimensional data display program including part of the malfunction analysis support program, can be provided via a communication medium, or may be provided in a storage medium storing the program. The storage medium that records the program for providing the functionality of the malfunction analysis support method to be performed by an applicable one of the malfunction analysis support apparatuses 30, 30A, 30B, 30C, and 30E, and the storage medium that records the three-dimensional data display program are each a computer-readable storage medium that stores a computer-executable program.

It can also be said that these programs cause a computer to perform processing to be provided by various aspects of the functionality of the log data acquisition unit 32, the time synchronization unit 33, the program operation display processing unit 34, the waveform display processing unit 35, the video display processing unit 36, the action reproduction unit 37, the three-dimensional data display processing unit 39, the time acquisition unit 40, the acoustic analysis display processing unit 41, the initial state generation unit 42, and the action information acquisition unit 43.

Specific examples of the display device 355 include a monitor and a display. Specific examples of the input device 354 include a keyboard, a mouse, and a touch panel.

As described above, the malfunction analysis support apparatuses 30, 30A, 30B, 30C, and 30E according to the first through sixth embodiments enable the state of the portion of a malfunction that has occurred in the control object 10 such as a manufacturing facility to be checked from any direction without an increase in cost as compared with the conventional technology.

The configurations described in the foregoing embodiments are merely examples. These configurations may be combined with a known other technology, and configurations of different embodiments may be combined together. Moreover, a part of the configurations may be omitted and/or modified without departing from the spirit thereof.

REFERENCE SIGNS LIST

1, 1A, 1B, 1C, 1D, 1E malfunction analysis support system; 10 control object (object to be controlled); 20, 20A, 20D control device; 21 device control unit; 22 log recording unit; 23 video recording unit; 24 acoustic recording unit; 25 malfunction detection unit; 30, 30A, 30B, 30C, 30E malfunction analysis support apparatus; 31 display unit; 32 log data acquisition unit; 33 time synchronization unit; 34 program operation display processing unit; 35 waveform display processing unit; 36 video display processing unit; 37 action reproduction unit; 38 display setting information storage unit; 39 three-dimensional data display processing unit; 40 time acquisition unit; 41 acoustic analysis display processing unit; 42 initial state generation unit; 43 action information acquisition unit; 60 action information recording device; 61 person; 62 unmanned transport machine; 71 imaging unit; 72 microphone; 100 workpiece; 101 support base; 110 receiving tray; 111 recessed portion; 120 conveyor mechanism; 121 first position; 122 second position; 123 guide rail; 130 robot hand mechanism; 131 shaft; 132 main body portion; 133 robot hand; 141, 142 sensor; 141A, 142A light-emitting element; 141B, 142B light-receiving element; 150 inspection unit; 200 program operation display screen; 210 program operation display area; 211, 241 horizontal scroll bar; 212, 242 vertical scroll bar; 220, 270, 300 time control area; 221 first recording unit; 222 log recording processing unit; 223 log storage processing unit; 224 second recording unit; 226 regeneration control button; 227, 272, 302 slider; 228, 273, 303 time display portion; 230 waveform display screen; 231, 231a, 231b, 231c, 232a, 232b, 232c waveform data; 240 waveform display area; 243 cursor; 250 video display screen; 260 video display area; 271, 301 operation button; 280 three-dimensional data display screen; 290 three-dimensional data display area; 351 processor; 352 memory; 353 storage device; 354 input device; 355 display device; 356 communication device; 357 data bus.

The invention claimed is:

1. A non-transitory malfunction analysis support program storage medium storing a malfunction analysis support program for supporting analysis of a malfunction of an object-to-be-controlled including an operational part, the malfunction analysis support program causing a computer to perform:

obtaining log data that records, in a time sequence, a state of the operational part, and input-output data of a control signal between the object-to-be-controlled and a control device that controls the object-to-be-controlled;

generating action reproduction simulation data that is a result of causing a virtual object-to-be-controlled corresponding to the object-to-be-controlled to reproduce an action based on the log data;

displaying the action reproduction simulation data on a display as three-dimensional data;

processing including at least one of displaying, on the display, a status of execution of a control program executed by the control device based on the log data, displaying, on the display, the state of the operational part and the input-output data of the control signal based on the log data using a waveform over time, or displaying, on the display, video data generated by imaging of a state of the object-to-be-controlled; and synchronizing time between the three-dimensional data to be displayed, reproduced in the generation of the action reproduction simulation data, and data to be displayed in the processing, wherein displaying the action reproduction simulation data on the display as three-dimensional data includes displaying the three-dimensional data on the display as viewed from a viewpoint position that is moved according to display setting information representing the viewpoint position for use when the virtual object-to-be-controlled is to be displayed on the display as the three-dimensional data.

2. The malfunction analysis support program storage medium according to claim 1, the malfunction analysis support program causing the computer to further perform:

when a time is specified for the three-dimensional data to be displayed or a time is specified for the data to be displayed in the processing, obtaining the time specified as a specified time, wherein synchronizing the time includes changing the log data to be used in the generation of the action reproduction simulation data and the log data or the video data to be used in the processing to data corresponding to the specified time.

3. The malfunction analysis support program storage medium according to claim 1, the malfunction analysis support program causing the computer to further perform:

obtaining acoustic data that is a record of a sound emitted by the object-to-be-controlled; and displaying an analysis result of analyzing the acoustic data on the display, wherein synchronizing the time includes synchronizing time among the three-dimensional data reproduced in the generation of the action reproduction simulation data and to be displayed, the data to be displayed in the processing, and the analysis result to be displayed.

4. The malfunction analysis support program storage medium according to claim 1, the malfunction analysis support program causing the computer to further perform:

obtaining action information that records, with time, an action of a person or of an unmanned transport machine present in a same area as the object-to-be-controlled, wherein generating the action reproduction simulation data includes generating the action reproduction simulation data representing a reproduction, based on the log data and on the action information, of an action on the virtual object-to-be-controlled and an action on a virtual person corresponding to the person or on a virtual unmanned transport machine corresponding to the unmanned transport machine, and displaying the action reproduction simulation data on the display as three-dimensional data includes displaying, on the display, the three-dimensional data including the virtual object-to-be-controlled and the virtual person or the virtual unmanned transport machine.

5. The malfunction analysis support program storage medium according to claim 1, wherein the log data further includes environmental data for an environment of an area where the object-to-be-controlled is disposed, and generating the action reproduction simulation data includes generating the action reproduction simulation data representing a reproduction of an action on the virtual object-to-be-controlled based on the log data and a result of simulation of a deformation of a member included in the object-to-be-controlled based on the environmental data.

6. The malfunction analysis support program storage medium according to claim 5, wherein displaying the action reproduction simulation data on the display as three-dimensional data includes changing a state of an object included in the three-dimensional data depending on a value of the environmental data.

7. The malfunction analysis support program storage medium according to claim 1, wherein the object-to-be-controlled is disposed in a portion of a facility without multiple cameras.

8. The malfunction analysis support program storage medium according to claim 1, wherein the object-to-be-controlled is disposed in a portion of a facility without full coverage by cameras.

9. A non-transitory malfunction analysis support program storage medium storing a malfunction analysis support program for supporting analysis of a malfunction of an object-to-be-controlled including an operational part, the malfunction analysis support program causing a computer to perform:

obtaining log data that records, in a time sequence, a state of the operational part, and input-output data of a control signal between the object-to-be-controlled and a control device that controls the object-to-be-controlled;

displaying video data generated by imaging of a state of the object-to-be-controlled on a display;

generating action reproduction simulation data that is a result of causing a virtual object-to-be-controlled corresponding to the object-to-be-controlled to reproduce an action based on the log data;

displaying the action reproduction simulation data on the display as three-dimensional data;

when a time is specified for the three-dimensional data to be displayed or a time is specified for the video data to be displayed in the display, obtaining the time specified as a specified time;

synchronizing time between the three-dimensional data to be displayed, reproduced in the generation of the action reproduction simulation data, and the video data to be displayed by the display based upon the specified time; and generating initial state information based on data representing a state of a member included in the object-to-be-controlled at the specified time, the initial state information including a position and an arrangement of the member included in the object-to-be-controlled, wherein generating the action reproduction simulation data includes setting a state of the member of the virtual object-to-be-controlled at the specified time based on the initial state information, and generating the action reproduction simulation data representing a reproduction, based on the log data, of an action on the virtual object-to-be-controlled for which the initial state information is set, and displaying the action reproduction simulation data on the display as three-dimensional data includes displaying the three-dimensional data on the display as viewed from a viewpoint position that is moved according to display setting information representing the viewpoint position for use when the virtual object-to-be-controlled is to be displayed on the display as the three-dimensional data.

10. The malfunction analysis support program storage medium according to claim 9, the malfunction analysis support program causing the computer to further perform:

obtaining action information that records, with time, an action of a person or of an unmanned transport machine present in a same area as the object-to-be-controlled, wherein generating the action reproduction simulation data includes generating the action reproduction simulation data representing a reproduction, based on the log data and on the action information, of an action on the virtual object-to-be-controlled and an action on a virtual person corresponding to the person or on a virtual unmanned transport machine corresponding to the unmanned transport machine, and displaying the action reproduction simulation data on the display as three-dimensional data includes displaying, on the display, the three-dimensional data including the virtual object-to-be-controlled and the virtual person or the virtual unmanned transport machine.

11. The malfunction analysis support program storage medium according to claim 9, wherein
the log data further includes environmental data for an environment of an area where the object-to-be-controlled is disposed, and
generating the action reproduction simulation data includes generating the action reproduction simulation data representing a reproduction of an action on the virtual object-to-be-controlled based on the log data and a result of simulation of a deformation of a member included in the object-to-be-controlled based on the environmental data.

12. The malfunction analysis support program storage medium according to claim 11, wherein displaying the action reproduction simulation data on the display as three-dimensional data includes changing a state of an object included in the three-dimensional data depending on a value of the environmental data.

13. A malfunction analysis support apparatus for supporting analysis of a malfunction of an object-to-be-controlled including an operational part, the malfunction analysis support apparatus comprising:
log data acquisition circuitry to obtain log data that records, in a time sequence, a state of the operational part, and input-output data of a control signal between the object-to-be-controlled and a control device that controls the object-to-be-controlled;
action reproduction circuitry to generate action reproduction simulation data that is a result of causing a virtual object-to-be-controlled corresponding to the object-to-be-controlled to reproduce an action based on the log data;
three-dimensional data display processing circuitry to display the action reproduction simulation data on a display as three-dimensional data;
processing circuitry being at least one display processing circuitry of program operation display processing circuitry, waveform display processing circuitry, or video display processing circuitry, the program operation display processing circuitry displaying, on the display, a status of execution of a control program executed by the control device based on the log data, the waveform display processing circuitry displaying, on the display, the state of the operational part and the input-output data of the control signal based on the log data using a waveform over time, and the video display processing circuitry displaying, on the display, video data generated by imaging of a state of the object-to-be-controlled; and
time synchronization circuitry to synchronize time between the three-dimensional data, reproduced in the action reproduction circuitry and to be displayed by the three-dimensional data display processing circuitry, and data to be displayed by the processing circuitry.

14. A malfunction analysis support apparatus for supporting analysis of a malfunction of an object-to-be-controlled including an operational part, the malfunction analysis support apparatus comprising:
log data acquisition circuitry to obtain log data that records, in a time sequence, a state of the operational part, and input-output data of a control signal between the object-to-be-controlled and a control device that controls the object-to-be-controlled;
video display processing circuitry to display video data generated by imaging of a state of the object-to-be-controlled, on a display;
action reproduction circuitry to generate action reproduction simulation data that is a result of causing a virtual object-to-be-controlled corresponding to the object-to-be-controlled to reproduce an action based on the log data;
three-dimensional data display processing circuitry to display the action reproduction simulation data on the display as three-dimensional data;
time synchronization circuitry to synchronize time between the three-dimensional data, reproduced in the action reproduction circuitry and to be displayed by the three-dimensional data display processing circuitry, and the video data to be displayed by the video display processing circuitry;
time acquisition circuitry to, when a time is specified for the three-dimensional data to be displayed in the three-dimensional data display processing circuitry or a time is specified for the video data to be displayed in the video display processing circuitry, obtain the time specified as a specified time, and provide the specified time to the time synchronization circuitry; and
initial state generation circuitry to generate initial state information based on data representing a state of a member included in the object-to-be-controlled at the specified time, the initial state information including a position and an arrangement of the member included in the object-to-be-controlled, wherein
the action reproduction circuitry sets a state of the member of the virtual object-to-be-controlled at the specified time based on the initial state information, and generates the action reproduction simulation data representing a reproduction, based on the log data, of an action on the virtual object-to-be-controlled for which the initial state information is set, and
the three-dimensional data display processing circuitry displays the three-dimensional data on the display as viewed from a viewpoint position that is moved according to display setting information representing the viewpoint position for use when the virtual object-to-be-controlled is to be displayed on the display as the three-dimensional data.

* * * * *